Jan. 27, 1925.

E. HEDENSKOOG 1,524,241

AUTOMATIC PIN SETTING MACHINE

Filed Jan. 28, 1922  28 Sheets-Sheet 1

Inventor
Ernest Hedenskoog
By: Wm O. Belt Atty

Jan. 27, 1925.

E. HEDENSKOOG

AUTOMATIC PIN SETTING MACHINE

Filed Jan. 28, 1922

Inventor
Ernest Hedenskoog
By: Wm O Belt Atty

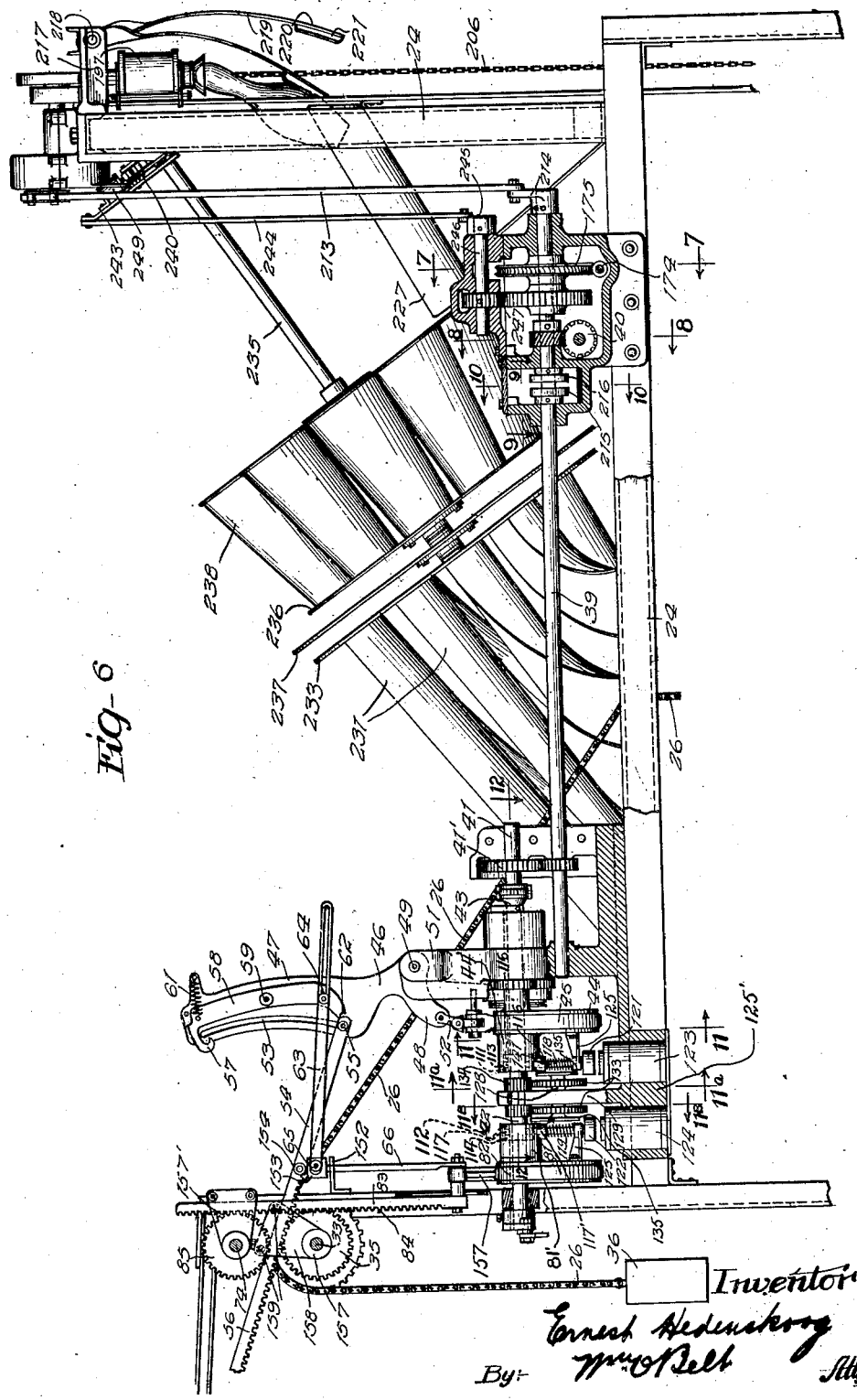

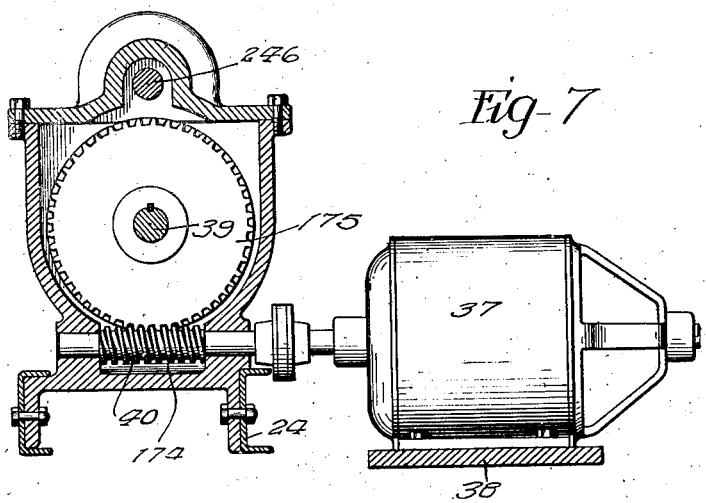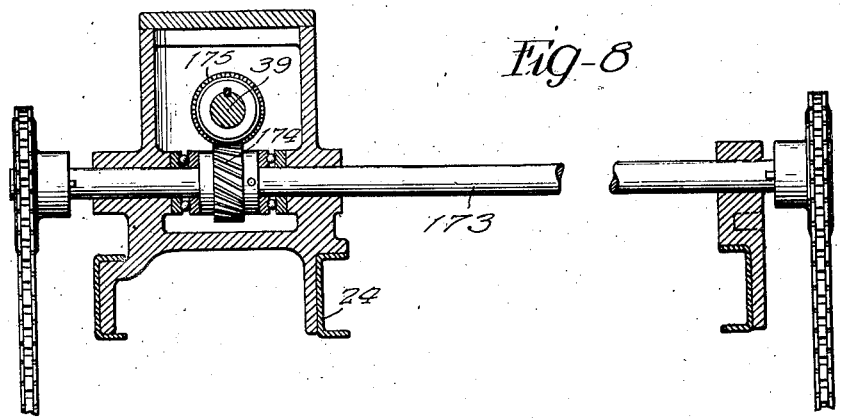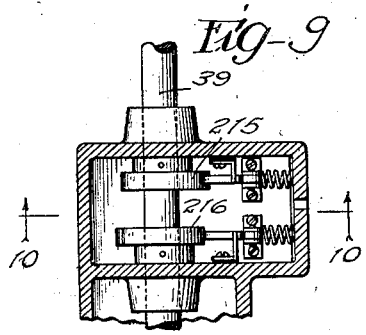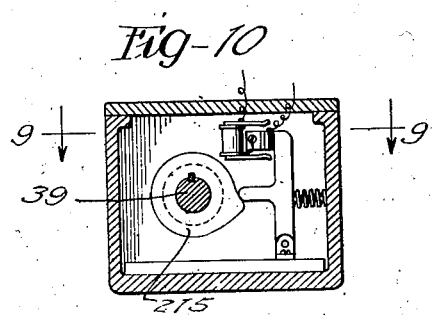

Jan. 27, 1925. 1,524,241
E. HEDENSKOOG
AUTOMATIC PIN SETTING MACHINE
Filed Jan. 28, 1922 28 Sheets-Sheet 6
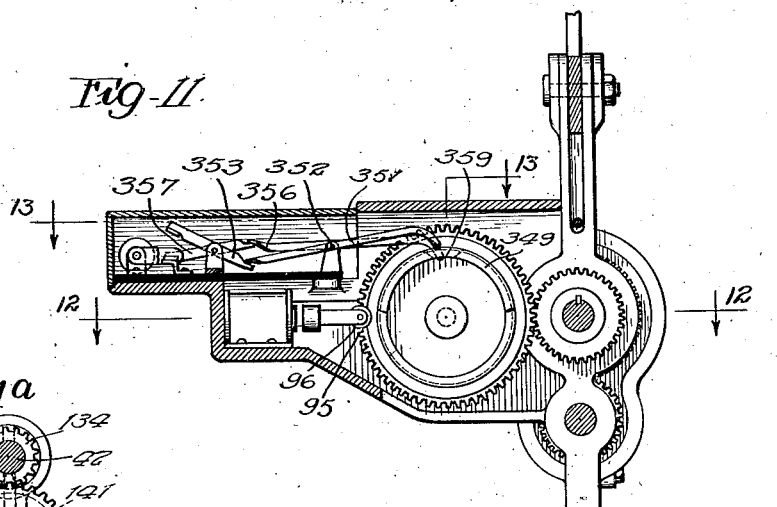
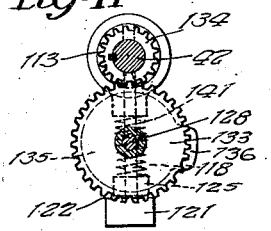
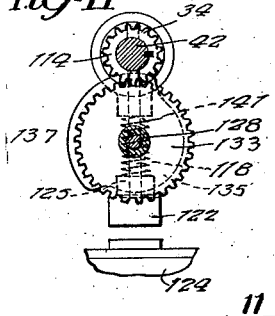
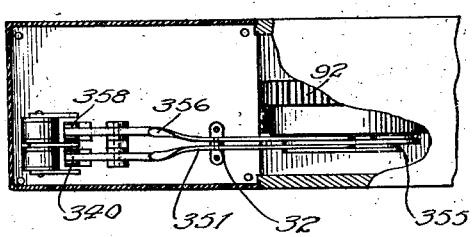
Inventor
Ernest Hedenskoog
By:- Wm. O. Bell Atty

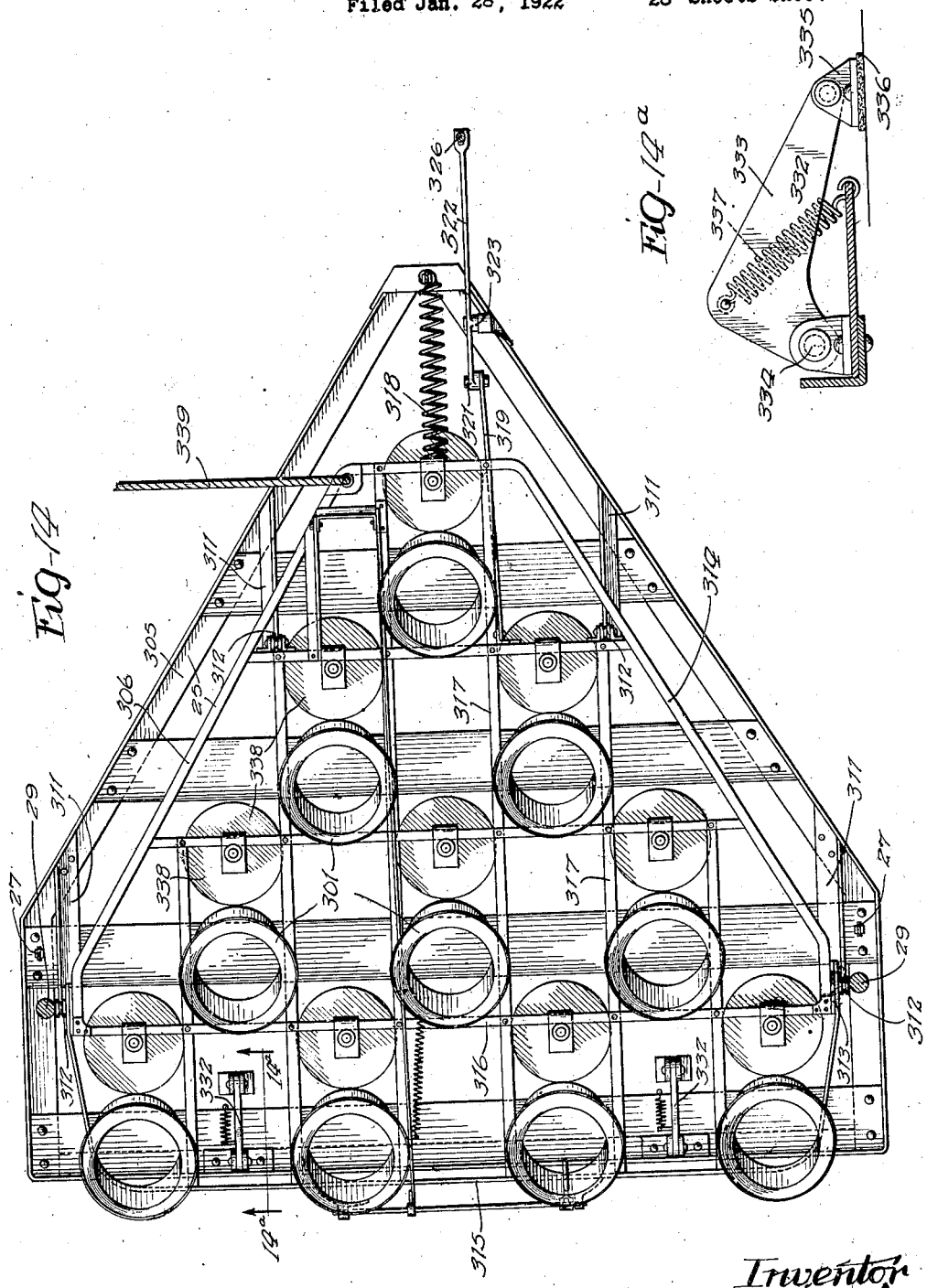

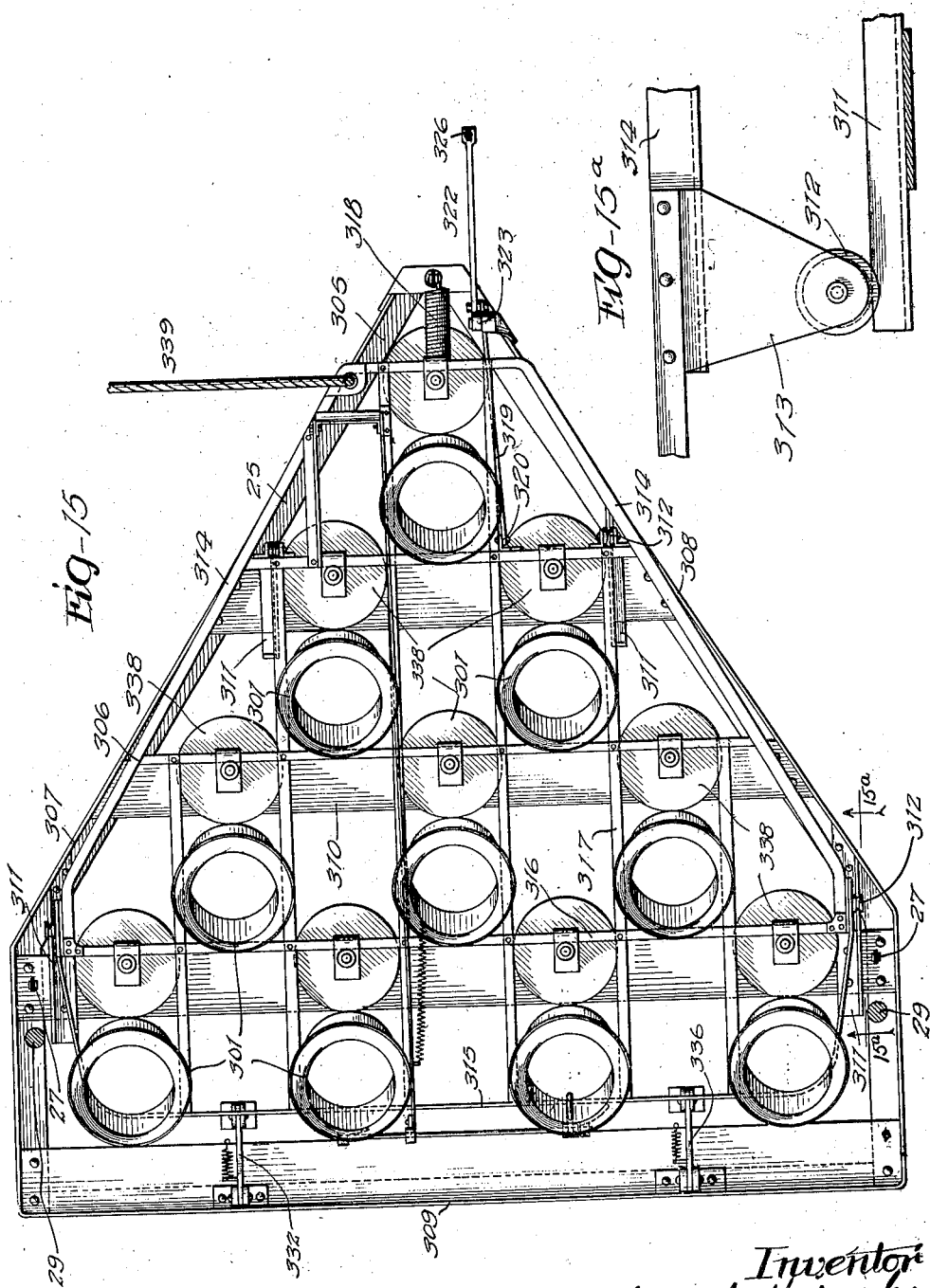

Jan. 27, 1925.

E. HEDENSKOOG 1,524,241

AUTOMATIC PIN SETTING MACHINE

Filed Jan. 28, 1922    28 Sheets-Sheet 12

Inventor
Ernest Hedenskoog
By Wm O. Bell Atty

Jan. 27, 1925.
E. HEDENSKOOG
1,524,241
AUTOMATIC PIN SETTING MACHINE
Filed Jan. 28, 1922  28 Sheets-Sheet 14
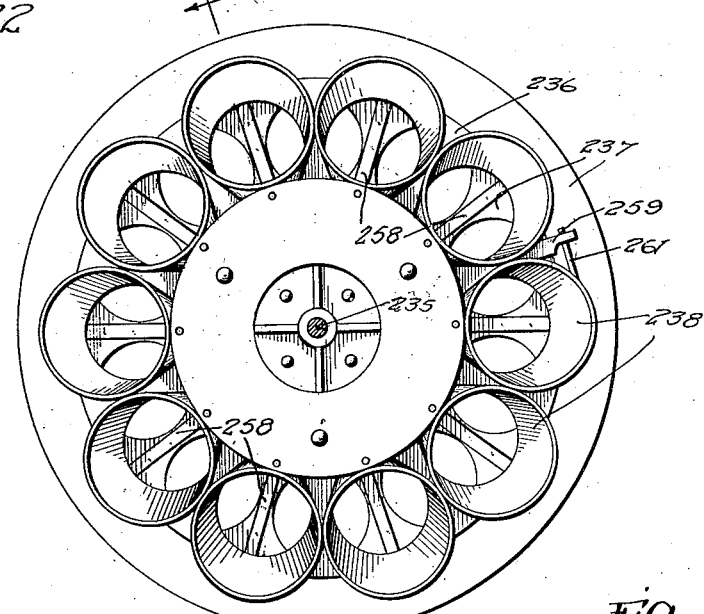
Fig-22
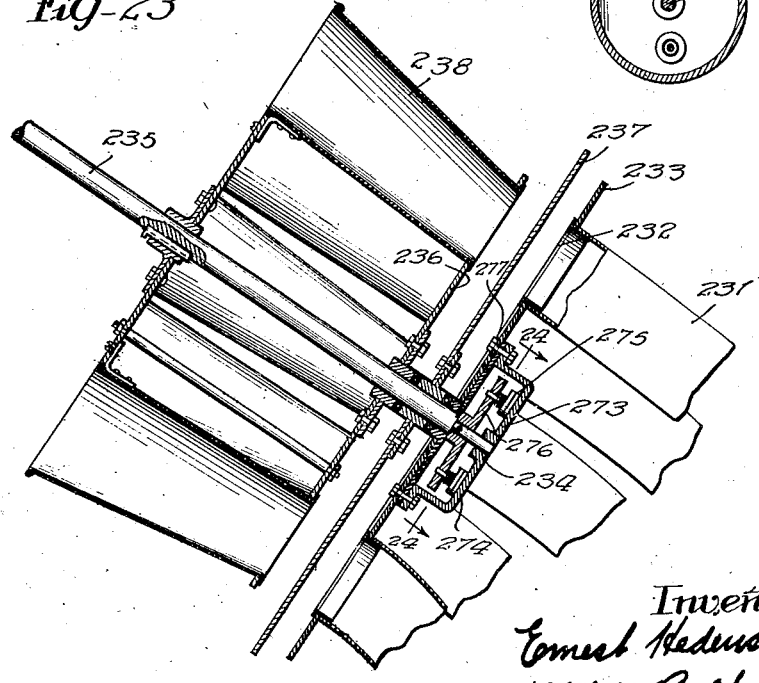
Fig-23
Fig-24
Inventor
Ernest Hedenskoog
By: Wm. O. Belt Atty Jan. 27, 1925.　　　　　　　　　　　　　　　　　1,524,241
E. HEDENSKOOG
AUTOMATIC PIN SETTING MACHINE
Filed Jan. 28, 1922　　　28 Sheets-Sheet 15

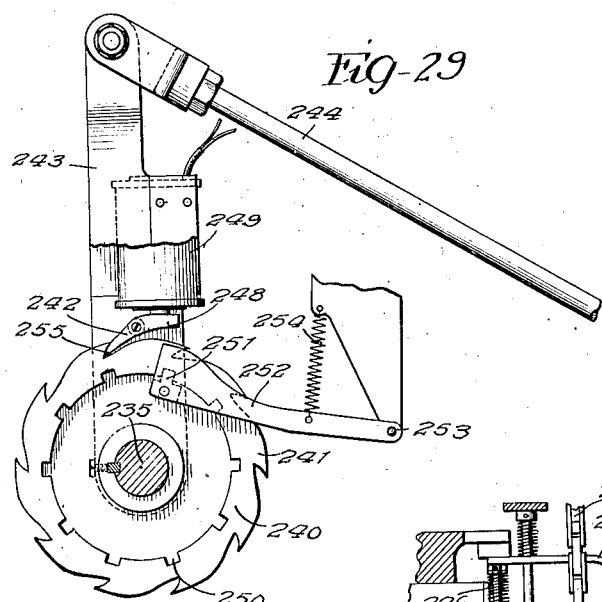
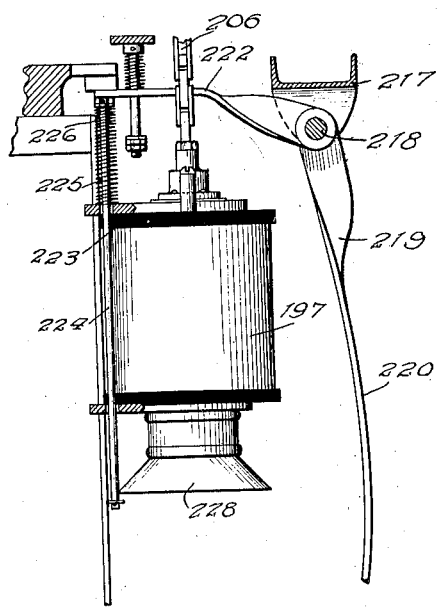
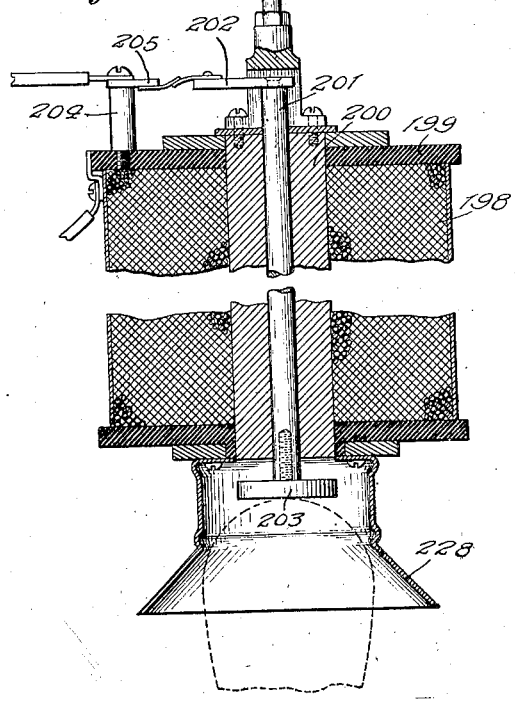

Jan. 27, 1925.   
E. HEDENSKOOG   
1,524,241

AUTOMATIC PIN SETTING MACHINE

Filed Jan. 28, 1922   28 Sheets-Sheet 19

Inventor
Ernest Hedenskoog
By:-

Jan. 27, 1925.  1,524,241
E. HEDENSKOOG
AUTOMATIC PIN SETTING MACHINE
Filed Jan. 28, 1922    28 Sheets-Sheet 19

Inventor
Ernest Hedenskoog
By:- Wm. O. Belt    Atty

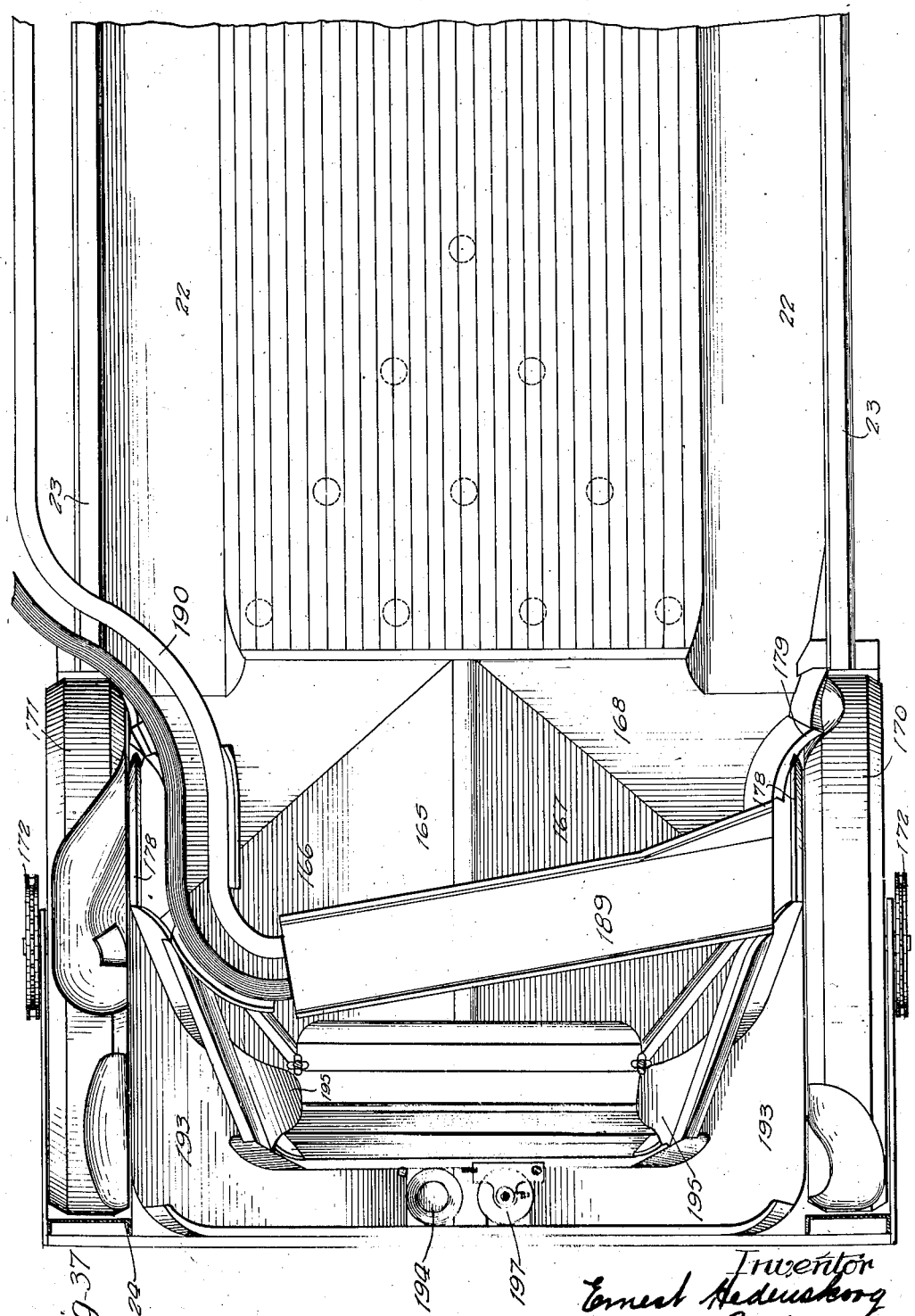

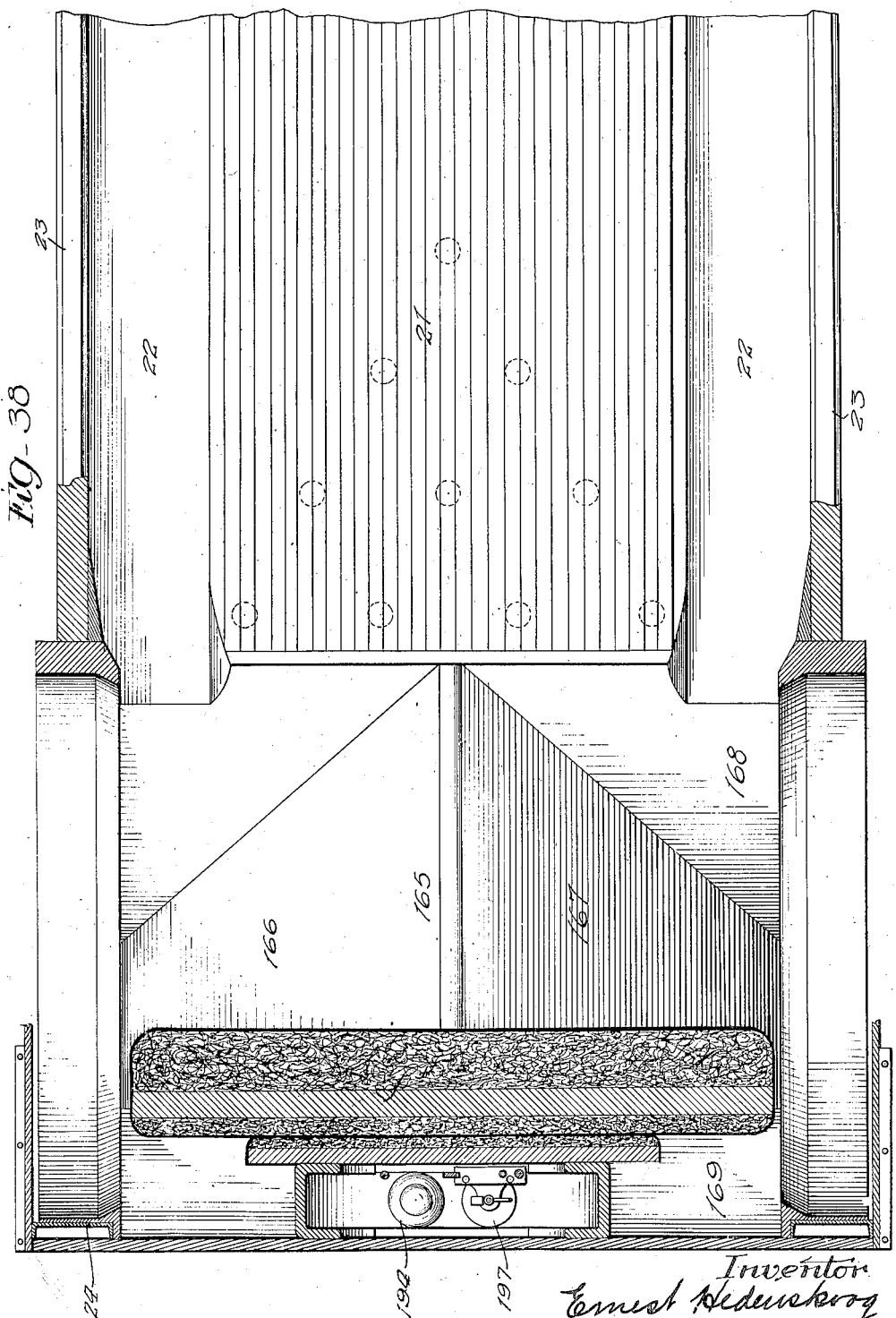

Jan. 27, 1925.
E. HEDENSKOOG
AUTOMATIC PIN SETTING MACHINE
Filed Jan. 28, 1922    28 Sheets-Sheet 22
1,524,241
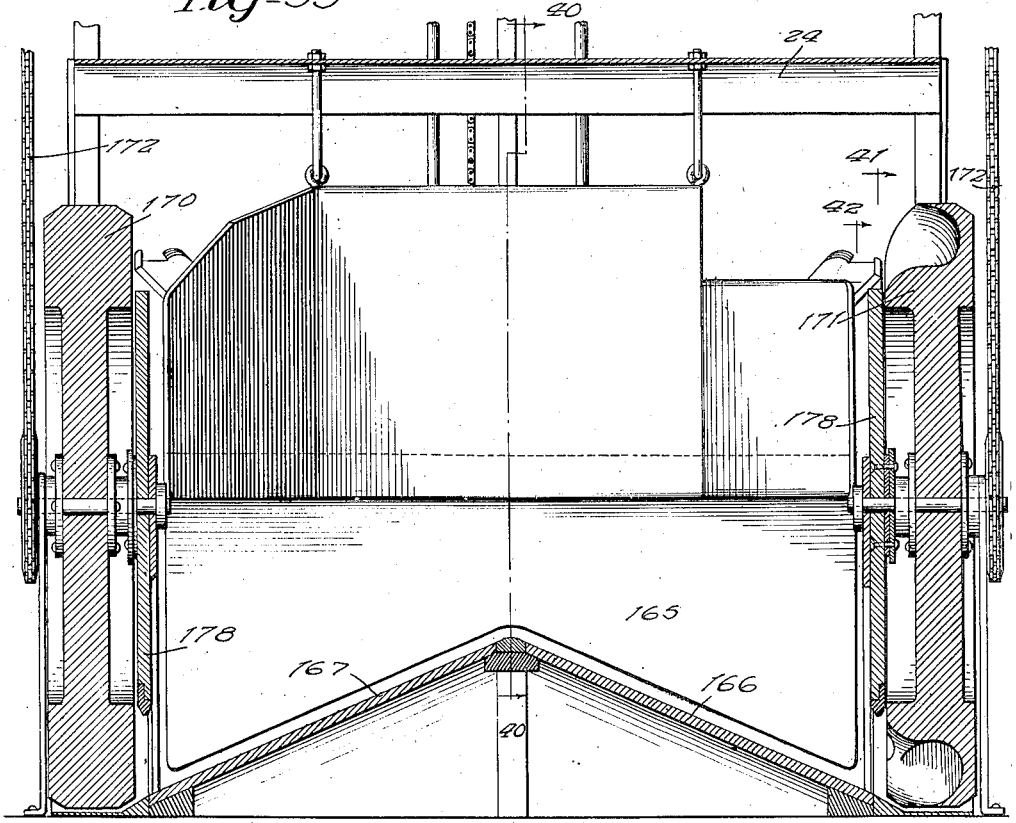
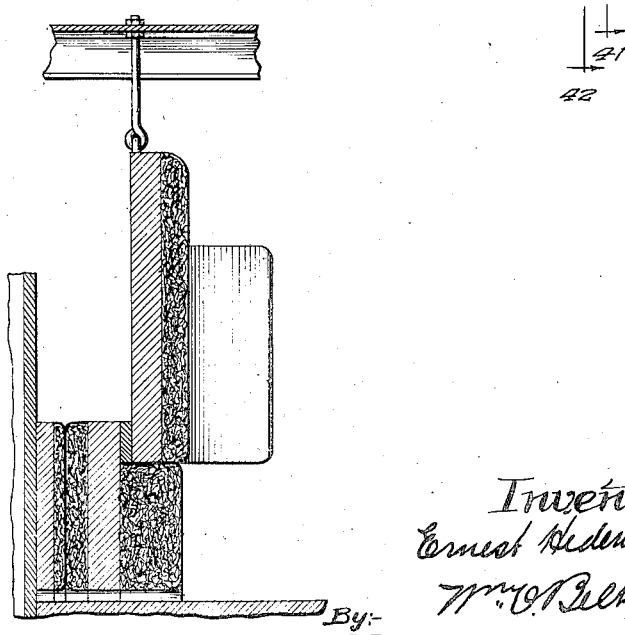

Jan. 27, 1925.
E. HEDENSKOOG
1,524,241
AUTOMATIC PIN SETTING MACHINE
Filed Jan. 28, 1922    28 Sheets-Sheet 23
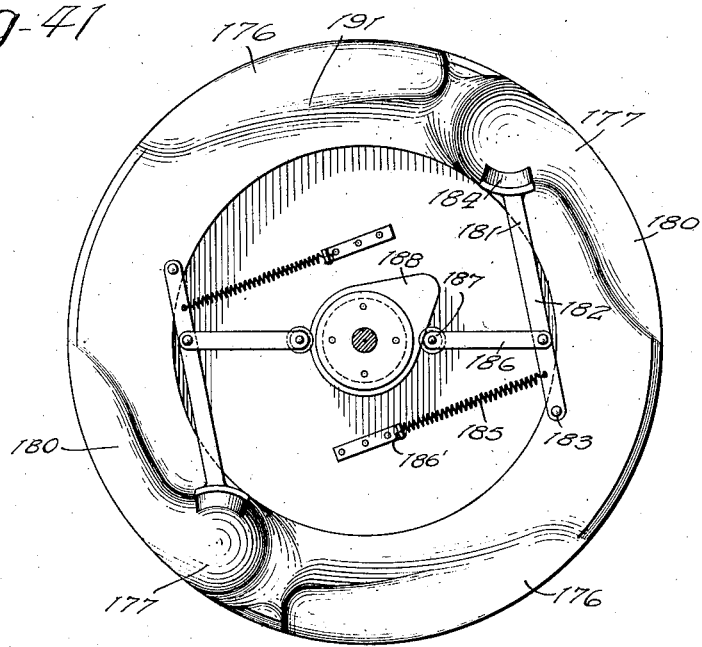
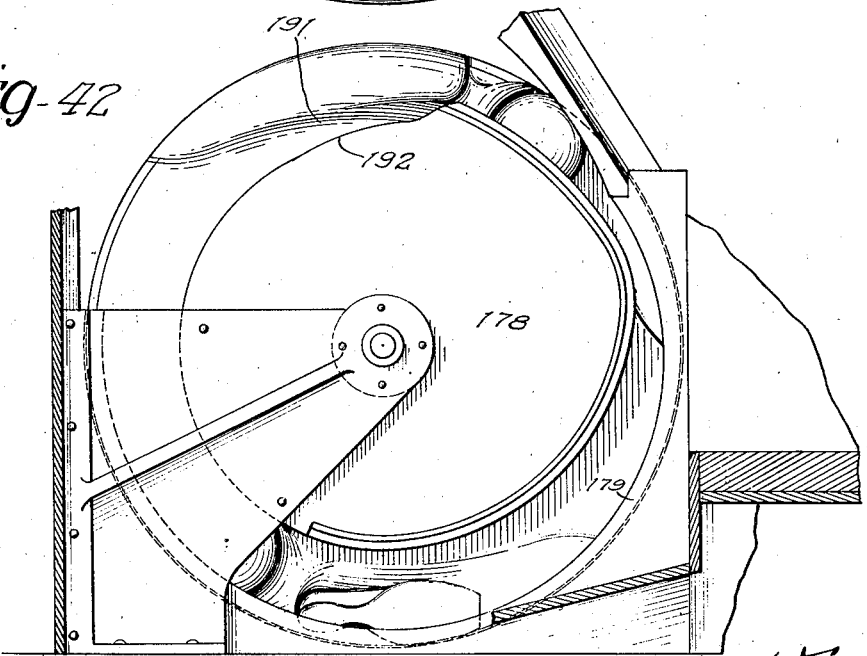

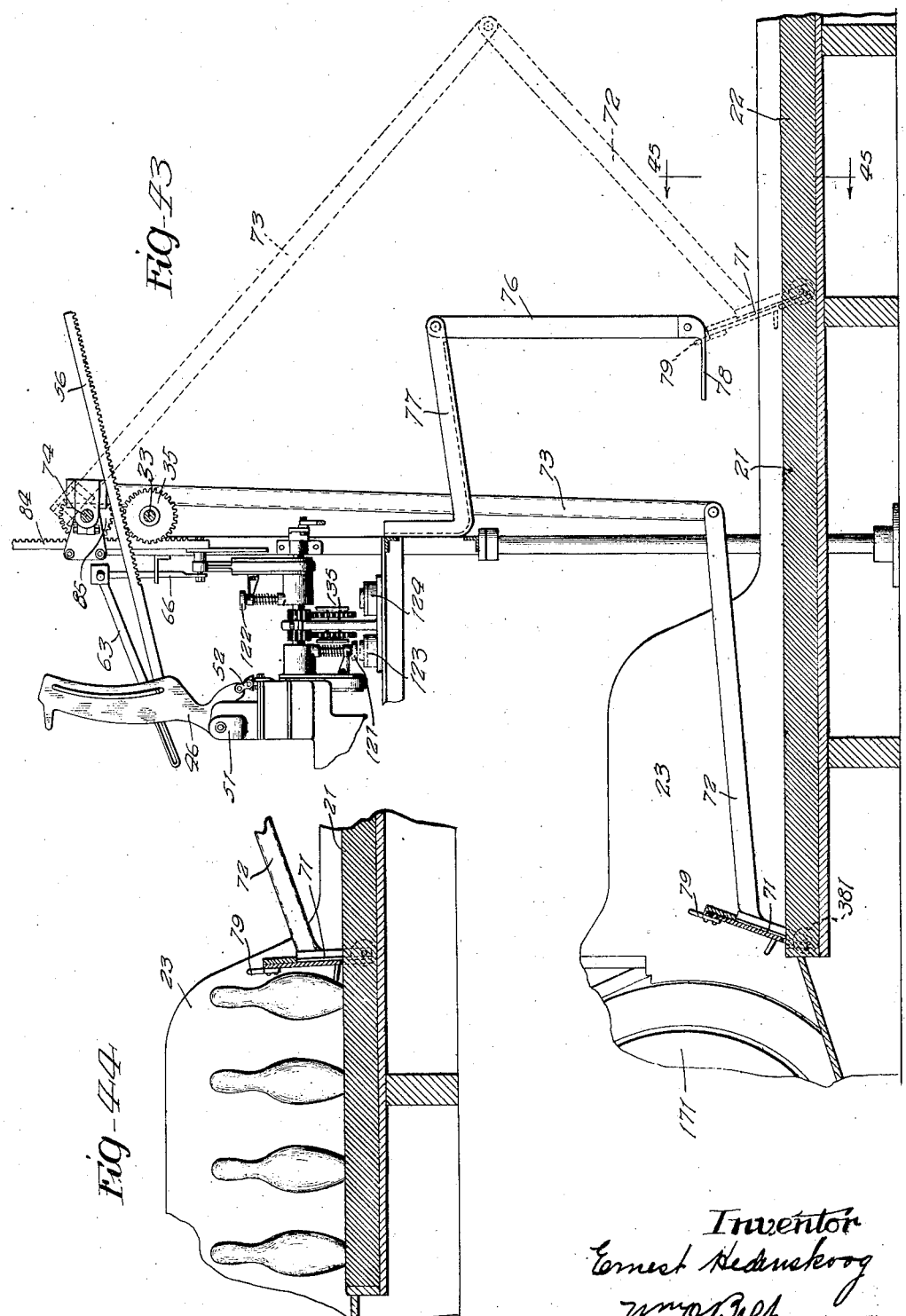

Jan. 27, 1925.　　　　　　　　　　　　　　　1,524,241
E. HEDENSKOOG
AUTOMATIC PIN SETTING MACHINE
Filed Jan. 28, 1922　　　28 Sheets-Sheet 25

Inventor
Ernest Hedenskoog
By:- Wm. O. Bell
Atty.

Jan. 27, 1925.                                                                  1,524,241
                    E. HEDENSKOOG
             AUTOMATIC PIN SETTING MACHINE
         Filed Jan. 28, 1922        28 Sheets-Sheet 28
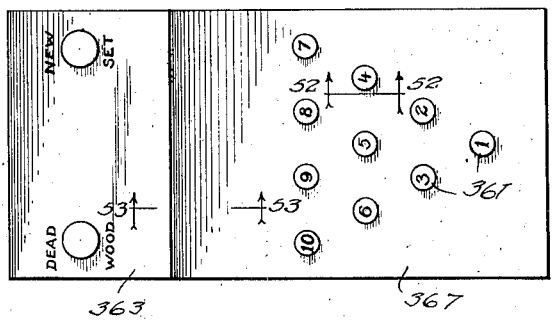
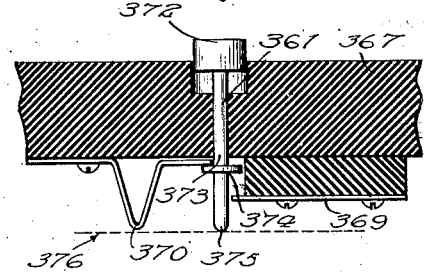
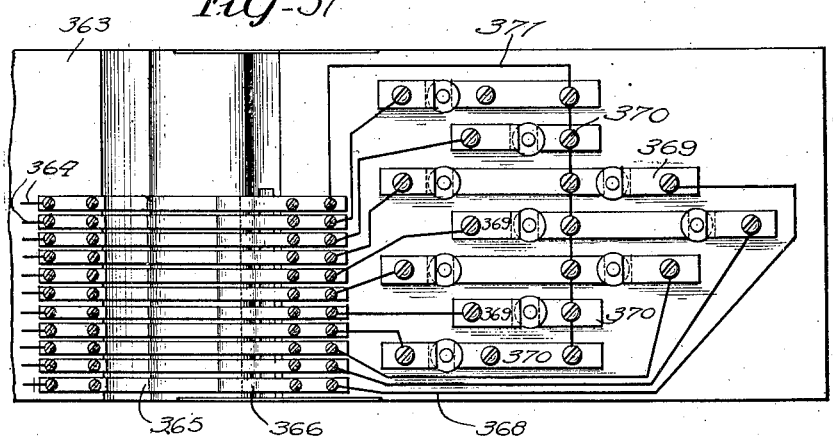
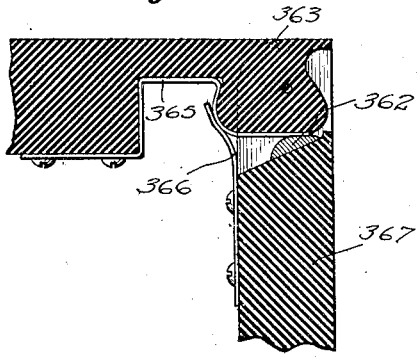
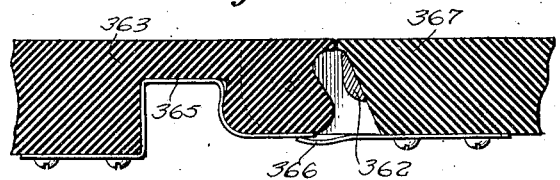

Patented Jan. 27, 1925.

1,524,241

UNITED STATES PATENT OFFICE.

ERNEST HEDENSKOOG, OF MUSKEGON, ILLINOIS, ASSIGNOR TO THE BRUNSWICK-BALKE-COLLENDER COMPANY, OF CHICAGO, ILLINOIS, A CORPORATION OF DELAWARE.

AUTOMATIC PIN-SETTING MACHINE.

Application filed January 28, 1922. Serial No. 532,356.

*To all whom it may concern:*

Be it known that I, ERNEST HEDENSKOOG, a citizen of the United States, residing at Muskegon, in the county of Muskegon and State of Illinois, have invented certain new and useful Improvements in Automatic Pin-Setting Machines, of which the following is a specification.

The object of the present invention broadly is to provide a machine to do all the work of the pin boy in setting pins upon the alley, removing dead wood and returning the balls to the player's position, and which will perform each of these operations more quickly and more accurately than they have been performed by the pin boy.

The invention relates to machines forming the subject-matter of Patents No. 1,190,646 and No. 1,190,648 granted July 11, 1916, and includes novel mechanisms and devices and combinations and arrangements of parts which may be incorporated in such machines.

One particular object of the invention is to provide improved means for operating the sweeper along the alley, and for supporting it in inoperative position above the alley.

Another object of the invention is to improve the construction and operation of the pin setter.

Another object is to provide improved means for clearing the pit and delivering the balls to the return track and the pins to the elevating mechanism.

Another object of the invention is to provide improved mechanism for the pins and novel devices for directing the elevated pins to the assembly magazine.

Another object of the invention is to provide an improved assembly magazine for receiving the pins from the elevating mechanism, and distributing them in the pin setter.

Another object of the invention is to provide an improved means for controlling the discharge of the pins from the magazine to the pin setter.

Another object of the invention is to provide improved means for operating the various mechanisms and for co-ordinating their movements.

Further objects will become apparent as the description is read in connection with the accompanying drawing showing a selected embodiment of the invention, and in which Fig. 1 is a side elevation of a bowling alley with a machine including the improved mechanisms mounted at the pit end thereof;

Figs. 4 and 5 are views similar to Fig. 3 showing the pin setter in the different operative positions;

Fig. 6 is a longitudinal section illustrating particularly the power mechanism for operating the machine;

Figure 1:
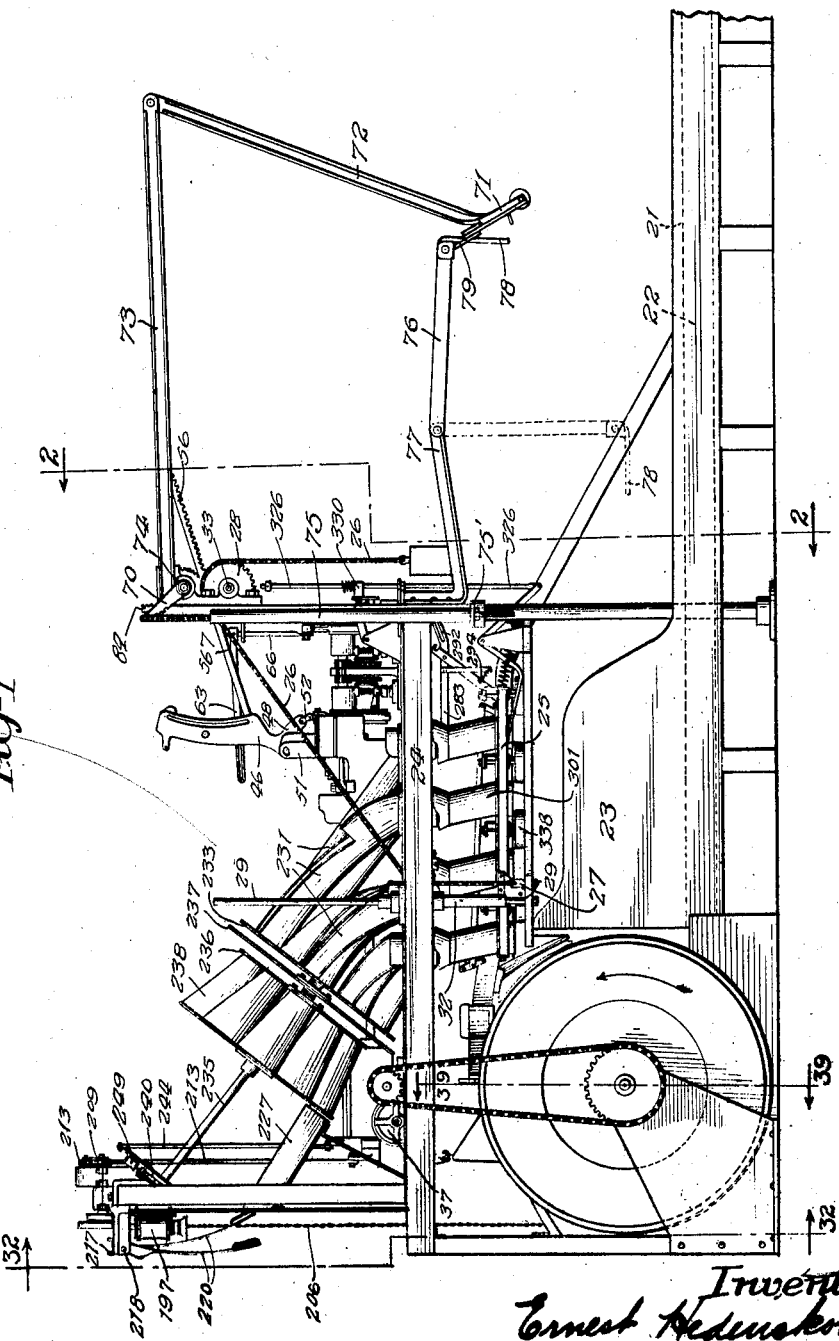
Figure 16:
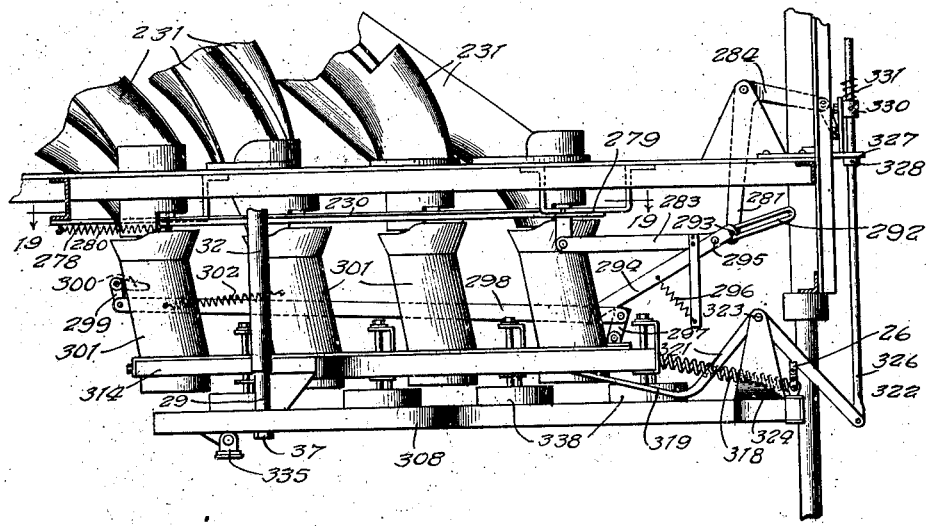
Figure 18:
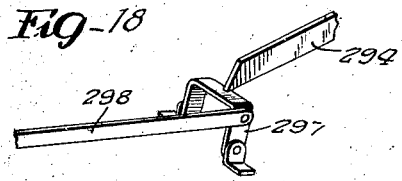
Figure 17:
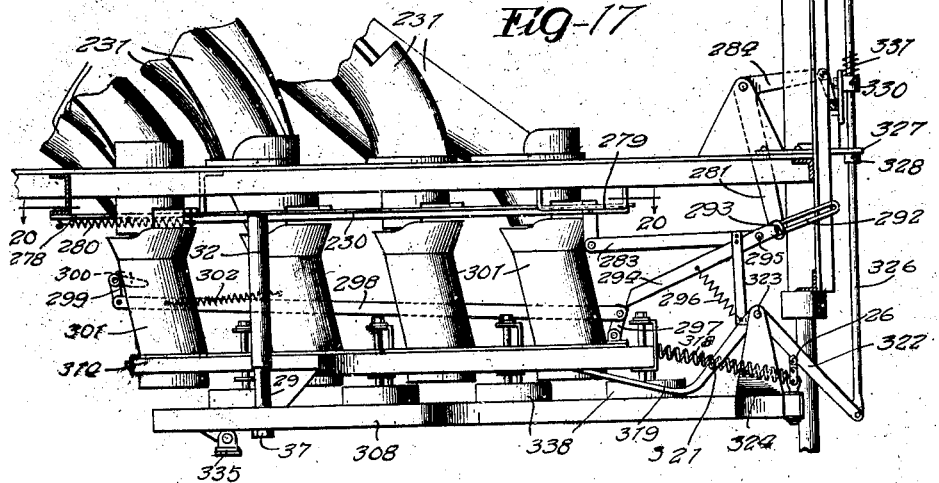
Figure 19:
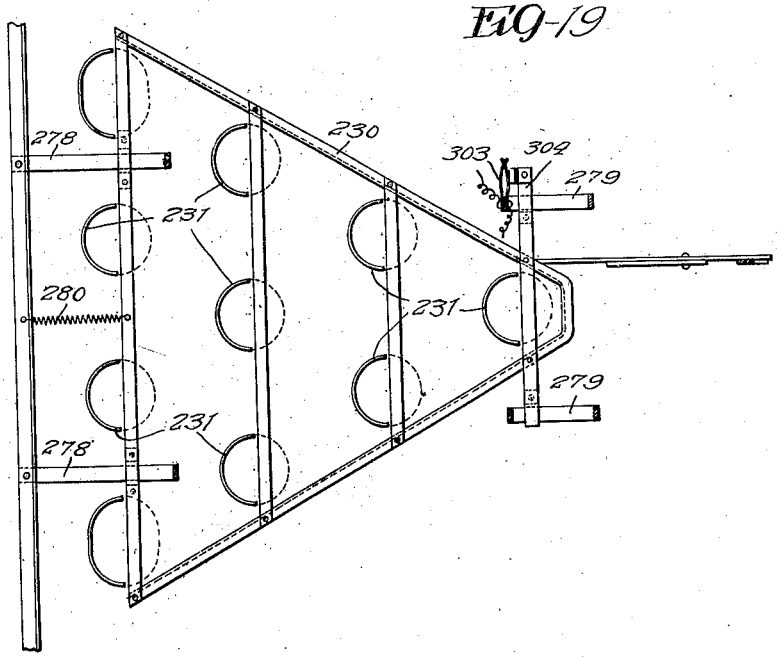
Figure 20:
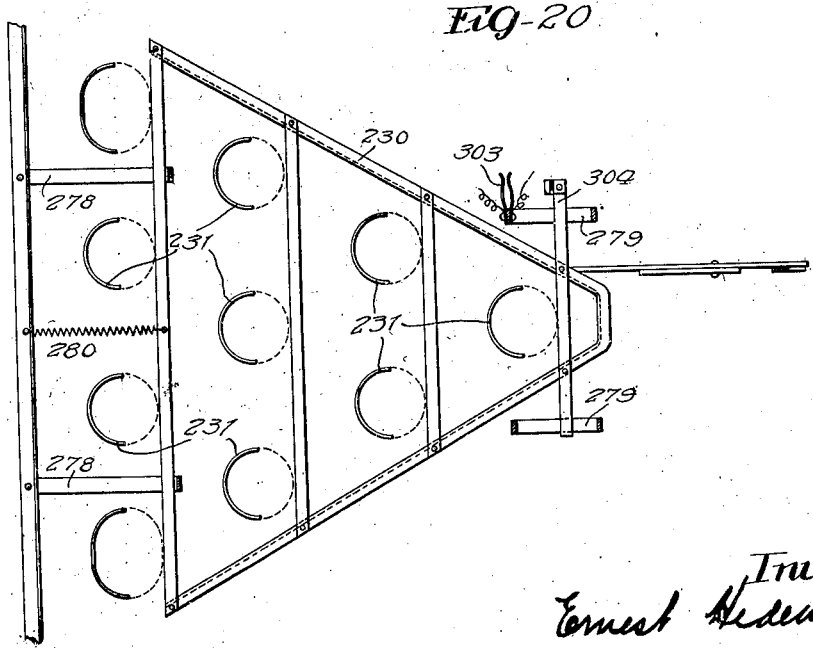
Figure 21:
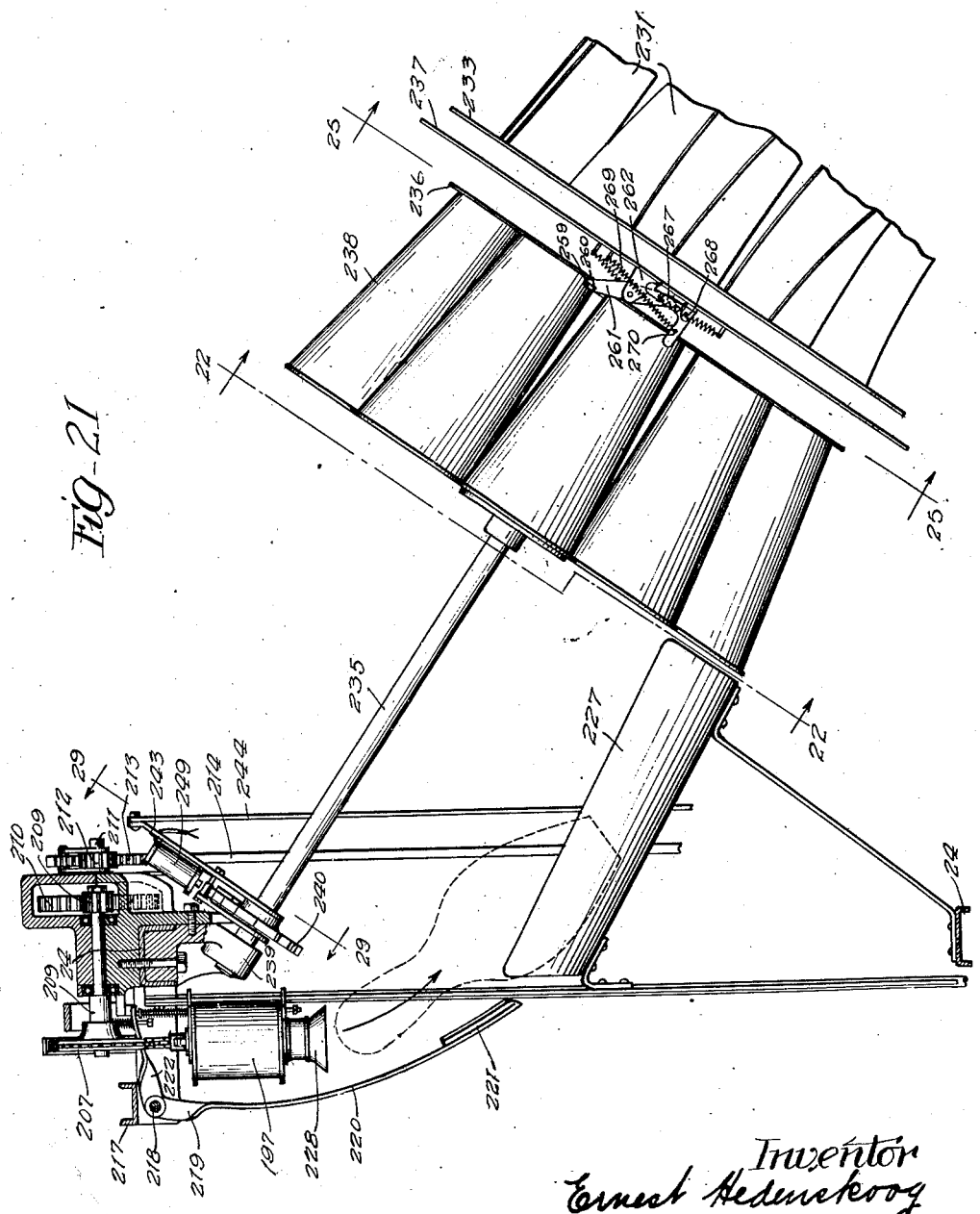
Figure 25:
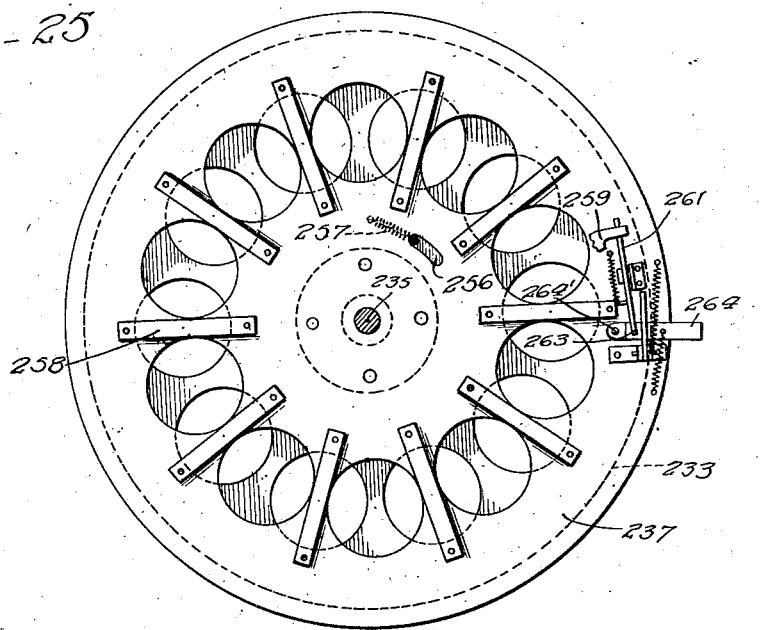
Figure 26:
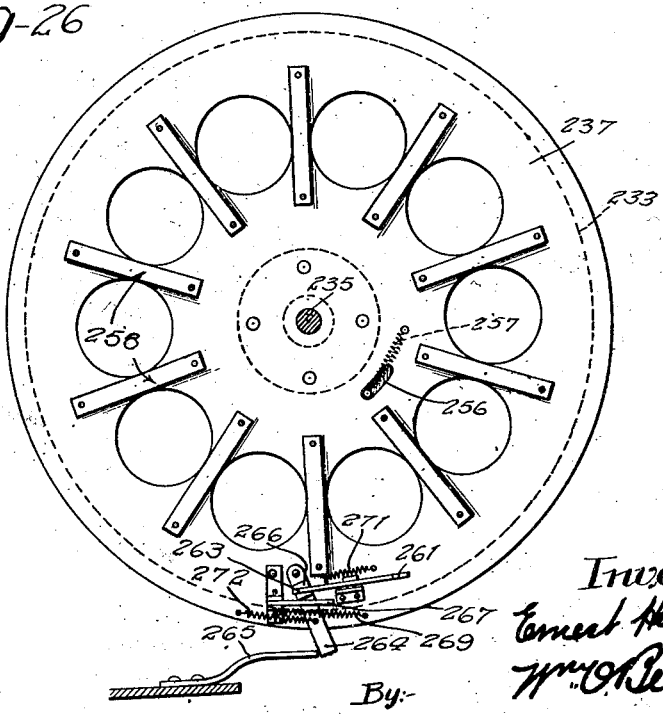
Figure 27:
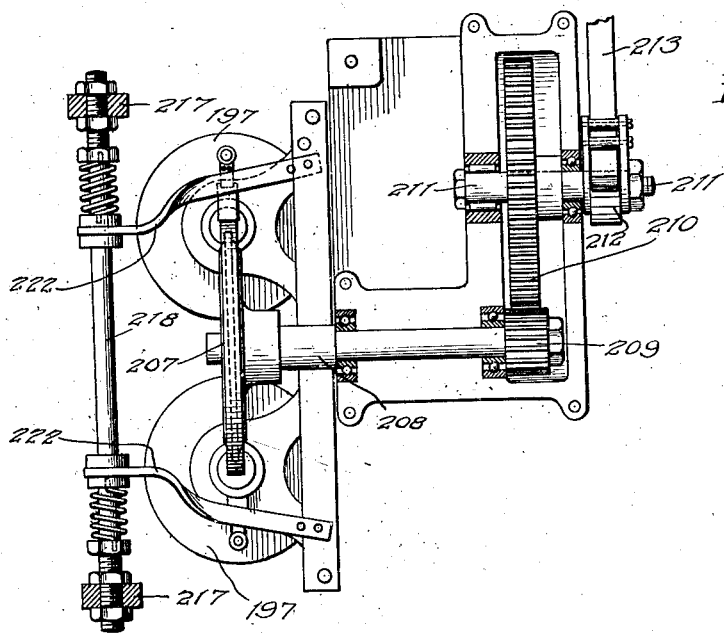
Figure 28:
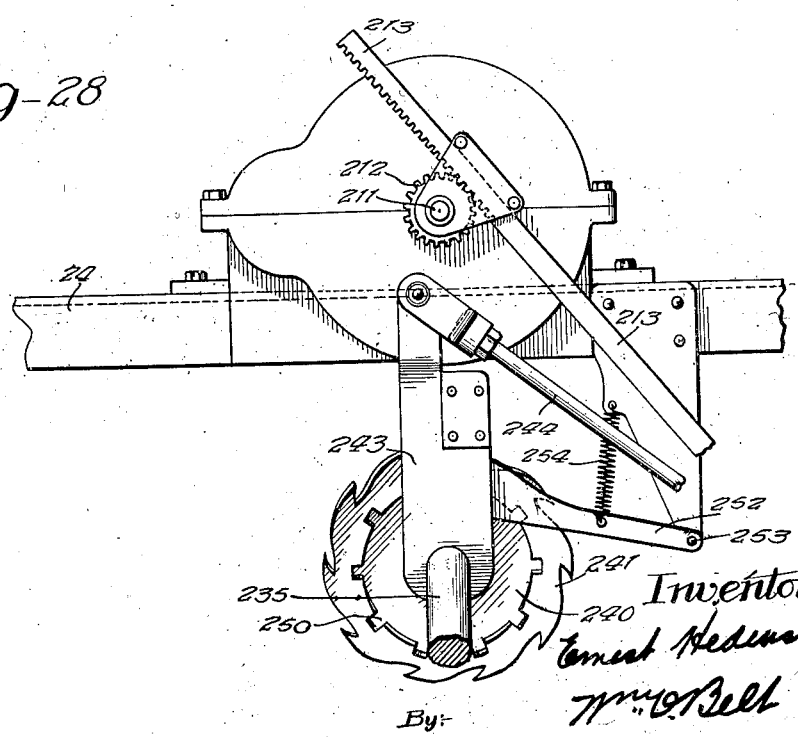
Figure 32:
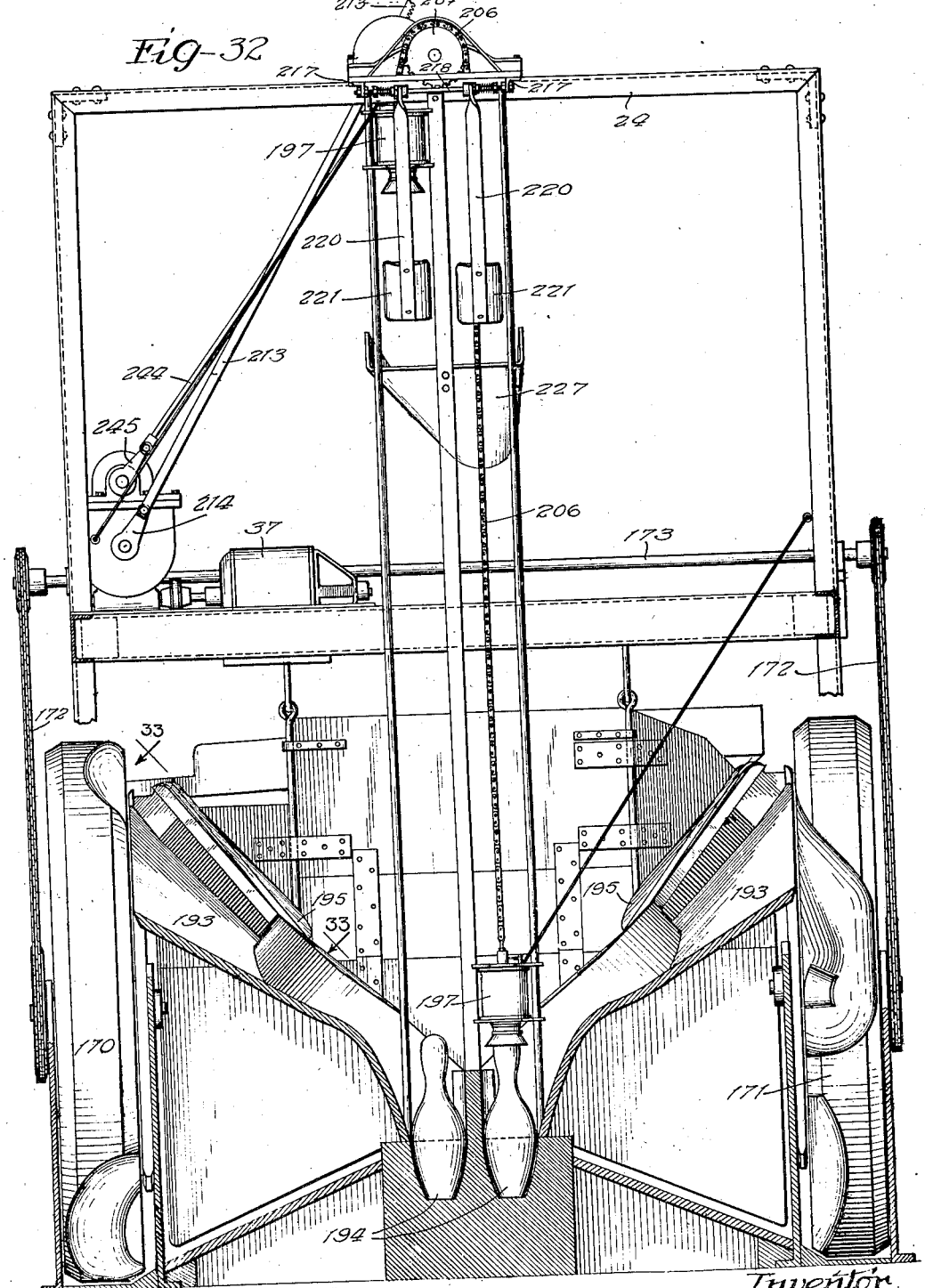
Figure 45:
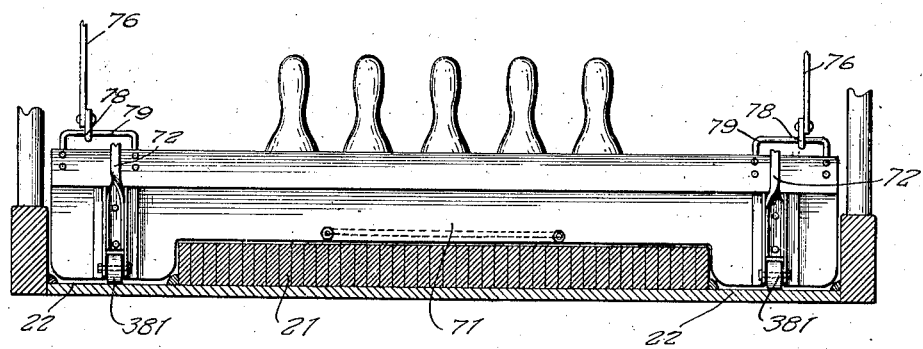
Figure 46:
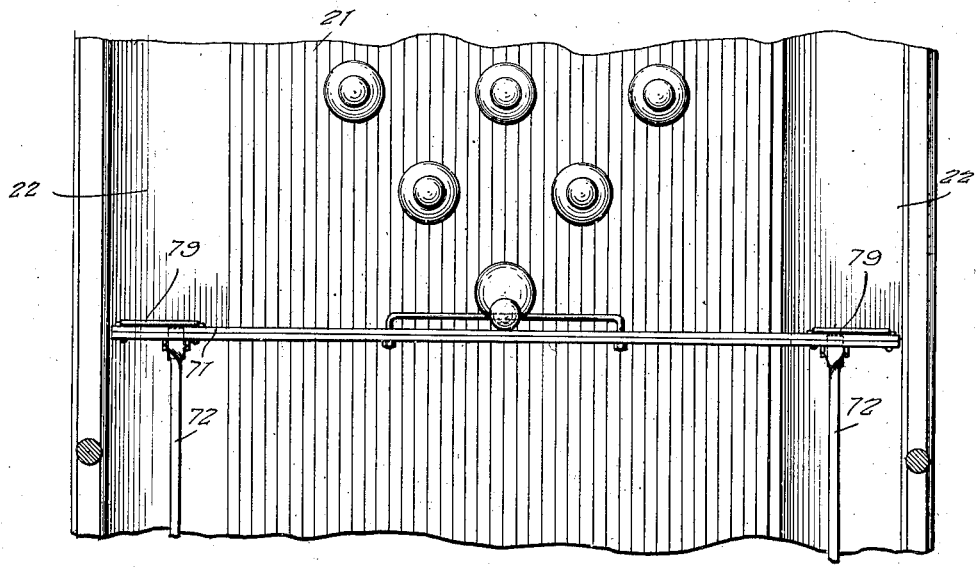
Figure 47:
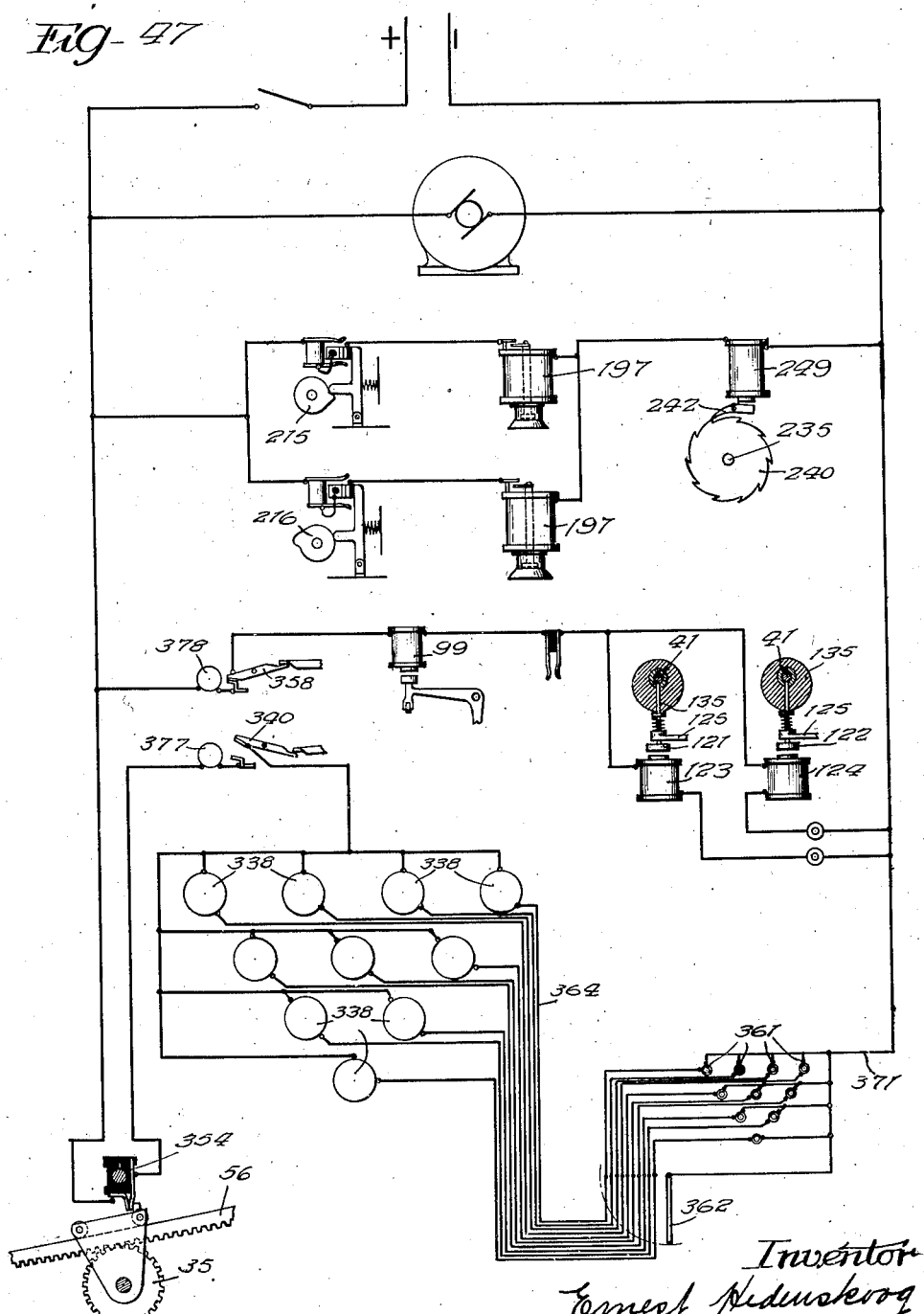
Figure 48:
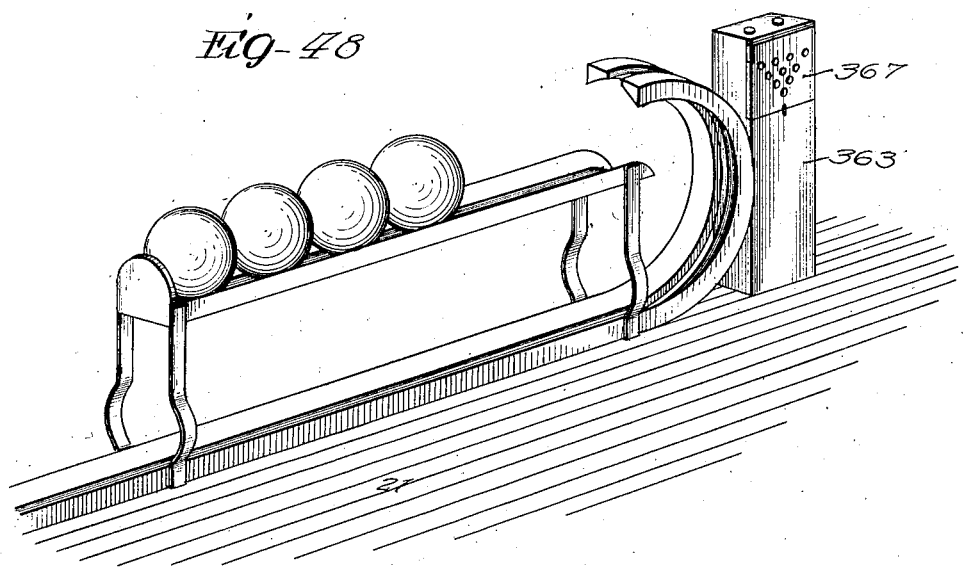
Figure 49:
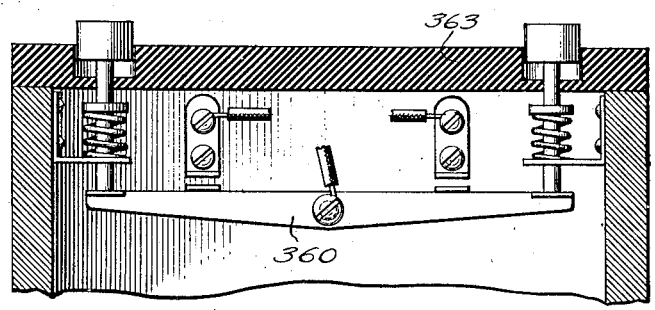

Figs. 7, 8, 9, 10, 11, 11$^a$, 11$^b$ and 12 are sectional views on the lines 7—7, 8—8, 9—9, 10—10, 11—11, 11$^a$—11$^a$, 11$^b$—11$^b$ and 12—12 respectively of Fig. 6;

Fig. 13 is a sectional view on the line 13—13 of Fig. 11;

Figs. 14 and 15 are plan views showing the pin setter in two different operative positions;

Fig. 14$^a$ in a detail view showing one of the steadying devices for the pin setter;

Fig. 15$^a$ is a detail view showing the means for mounting the pocket carrying frame on the pin setter frame;

Figs. 16, 17 and 18 are views showing the controlling means for the pin supporting frame;

Figs. 19 and 20 are plan views showing the pin supporting frame in the different positions;

Fig. 21 is an enlarged detail showing the means for delivering the elevated pins to the assembly magazine;

Figs. 22, 23 and 24 are sections on the lines 22—22, 23—23 and 24—24 of Figures 21, 22 and 23 respectively;

Figs. 25 and 26 are similar sectional views taken on the lines 25—25 and 26—26 respectively of Fig. 21 and showing the pin retainer in different positions;

Fig. 27 is a plan view of a detail of the pin elevating mechanism;

Figs. 28 and 29 are fragmentary side elevations showing the means for controlling the rotary creel;

Figs. 30 and 31 are enlarged detail views showing the pin elevating magnets;

Fig. 32 is a transverse section on the line 32—32 of Fig. 1:

Figs. 33, 34, 35 and 36 are enlarged details illustrating the construction of the reversing pockets;

Fig. 37 is a plan view with the pin setter frame and superstructure removed;

Fig. 38 is a similar view illustrating the construction of the pit;

Fig. 39 is a transverse section on the line 39—39 of Fig. 1;

Fig. 40 is an enlarged sectional view of a detail;

Figs 41 and 42 are enlarged details showing the pit clearing wheels;

Fig. 43 is a side elevation showing the sweeper in rearmost position;

Fig. 44 is a detail illustrating the sweeper approaching a set of pins on the alley;

Figs. 45 and 46 are plan and elevation respectively of the sweeper;

Fig. 47 is a wiring diagram;

Fig. 48 is a perspective view of a ball rack and switch post;

Fig. 49 is a sectional view illustrating the construction of the controlling switches;

Figs. 50, 51, 52, 53 and 54 are details of the switch post and switches.

The invention includes a sweeper for clearing the alley, a pin setter for setting the pins on the spots of the alley, mechanism for removing the pins and balls from the pit, delivering the balls to a return track, and the pins to an elevator, a pin elevator for raising the pins to an assembly magazine from which they are delivered to the pin setter, power mechanism for operating the various devices, and means to co-ordinate their movements.

A pin setting machine embodying all these things is shown in the drawings set up at the pit end of the bowling alley (Figs. 1 and 43). The alley comprises, as usual, the bed 21, gutters 22 and side walls or kickbacks 23. The various mechanisms and devices of the pin setting machine are carried by a main frame 24 erected at the end of the alley. A pin setter 25 which will be described in detail later, is mounted to move vertically in the main frame, and is normally retained in elevated position by the chains 26 fastened at 27 to the pin setter 25 and passing over sprockets 28 carried by the shaft 33, means being provided to rotate the shaft 33 and actuate the sprocket wheels at proper times to lower and raise the pin setter. The pin setter is guided in its movement by suitable guide rods 29 rigidly fastened at their lower ends 31 to the pin setter, and passing through fixed guides 32 suitably secured above the elevated or normal position of the pin setter. The shaft 33 is journaled in brackets 34 supported near the top of the main frame 24, and carries a pinion 35 at one end, by which it is driven through suitable mechanism later to be described in response to pressing a button at the player's end of the alley. A counterweight 36 is secured to the free ends of the chains 26 and reduces materially the power needed to raise and lower the frame as the machine is operated.

The pinion 35 and all other moving parts of the pin setting machine receive their power from a motor 37 mounted upon a shelf 38 suitably supported on the main frame 24. This motor continuously drives a main power shaft 39 (Figs. 6 and 7) through suitable gearing 40 here shown as a worm wheel and worm. The shaft 39 is journaled in suitabe bearings which support it lengthwise to the main frame 24 and drives a jack shaft 41 through suitable reduction gearing 41'. The jack shaft 41 is adapted to drive an eccentric shaft 42 through a clutch 43 which is engaged and disengaged at appropriate intervals, as will hereinafter be explained. An eccentric 44 carrying a strap 45 is loosely mounted on the shaft 42 and a bell crank 46 having a long arm 47 and a short arm 48 is pivoted at 49 to a bracket 51 carried by the main frame above the shaft 42 so that the end of the short arm 48 of the bell crank is above the strap 45. The free end of this arm is connected by a link 52 to the strap 45 so that the rotation of the eccentric causes the bell crank to oscillate about its pivot 49. The long arm 47 of the bell crank is provided with an elongated slot 53 in which a pin 55 fixed to the driving rod 54 is slidably mounted. The driving rod extends outwardly over the pinion 35, and is provided along its lower surface with a rack 56 adapted to engage with the teeth of the pinion 35 to rotate the pinion as the bell crank 46 is moved by the eccentric.

The pin setting machine embodying my invention performs two main operations. One setting the pins in position upon the alley bed, and the other removing the dead wood after the first ball has been rolled along the alley. In the first operation the pin setter is lowered to just above the alley bed and from this position deposits the pins accurately upon the spots. In removing the dead wood, the pin setter is lowered to the height of the standing pins which it lifts above the alley while the pins which have fallen upon the alley bed are swept into the alley pit, as will be later described, after which operation the pin setter returns and replaces the standing pins. The travel of the pin setter is therefore different in the two operations and this difference of travel is accomplished with my invention by varying the distance of the point of connection of the driving rod 54 with the long arm 47 of the bell crank 46, from the pivotal axis 49 of the bell crank. In Fig. 6 the pin 55 which connects the bell crank and driving rod is shown located at the lower end of the slot 53, i. e., the end of the slot nearest to the pivotal axis of the bell crank, which is the position throughout the dead wood operation. When it is desired to make the new set, the rod 54 is elevated, as will be hereinafter explained, until the pin 55 engages the upper end of the slot 53 where it is locked in position by a hook 57 carried by one end of a lever 58 pivoted at 59 on the arm 47 adjacent to the slot 53. The lever 58 is normally moved to bring the hook 57 into locking position by a spring 61 connected at one end to the lever 58 and at the other end to the bell crank arm 47. The lever 58 is provided at its lower end with a notch or recess 62 adapted to receive the pin 55 when the driving rod is in its lower, or normal position. The movement of the lever 58 under the force of the spring 61 serves to bring both the hook 57 and the recess 62 in the path of the pin 55 so that the end of the driving rod 54 will be locked in the end of the slot 53 at which it is located. When the bell crank 46 is in normal position, the lever 58 is moved to release the pin 55 by the link 63 having a pin and slot connection 64 at one end with the lever 58 and being pivoted at the other end 65 to the reciprocating rod 66 operated by the eccentric 81 through the strap 82, as will later appear.

A sweeper 71 (Fig. 1) carried by the arms or links 72 is adapted to move along the alley bed to remove the dead wood to clear the alley after the pin setter has elevated the standing pins, or when it is desired to make a new set. The links 72 extend upwardly and are pivoted at their upper ends to a frame here shown in the form of arms 73, which are fixedly secured upon a shaft 74 loosely journaled on the main frame above the shaft 33. Mechanism is provided to turn the shaft 74 in one direction at proper times, to lower the frame 73, and move the sweeper rearwardly along the alley bed, and back again in the opposite direction, to return the sweeper to normal position. The frame 73 is normally held in elevated position shown in Fig. 1, to maintain the sweeper above the alley bed, partly by counterbalancing springs 75 fastened at one end to the frame at 75′, and at the other end to short lever arms 70 fixed on the shaft 74 and partly by the device provided to actuate and control the sweeper. The sweeper is directed toward the pit end of the alley by rods 76 pivoted to the brackets 77 on the main frame 24, and having the hooks 78 adapted to automatically engage and disengage the bails or eyes 79 carried by the sweeper. The mechanism for operating the sweeper consists of an eccentric 81 (Fig. 6) mounted loosely on the shaft 42, a strap 82 embracing said eccentric, and a rod 83 extending upwardly from said strap and provided with a rack 84 which actuates the pinion 85 rigidly mounted on the shaft 71. Where the eccentric 81 is locked to the shaft 42 rotation of the shaft imparts a vertical reciprocatory movement to the rod 83 which is converted by the rack and pinion into rotary movement given to the shaft 74 for moving the sweeper back and forth along the alley bed.

Referring to Fig. 1, when the shaft 74 is rotated in a clockwise direction, the arms 73 descend to the position shown in Fig. 43. As these arms move downwardly, the arms 76 move about their pivots and direct the sweeper towards the pit end of the alley, as indicated in dotted lines in Fig. 43. With the continued rearward movement of the sweeper, the eyes or bails 79 move off of the hooks 78, and as the arms 73 return to the solid line position shown in Fig. 1, the arms 76 cause the links 72 to swing to the position indicated in solid lines in Fig. 1, thereby holding the sweeper in position to give it rearward movement as soon as the shaft 74 is again rotated in clockwise direction. The operations of the sweeper and pin setter are controlled and timed by mechanism consisting of a device for throwing in the clutch 43 to operatively connect the shaft 42 with the shaft 41, during two complete revolutions, and means for rendering the eccentrics 44 and 81 inoperative at the proper intervals. When a new set is to be made, it is desirable that as soon as the sweeper has finished its rearward or sweeping movement along the alley bed, the pin setter frame should start downwardly to deposit the set of pins upon the alley. The timing mechanism to be now described causes the eccentric 81 to rotate with the shaft 42 as soon as that shaft is locked to the shaft 41. The first half of the revolution of the shaft 42 moves the sweeper rearwardly along the alley bed to clear the alley, at the end of which time the eccentric 44 is engaged with the shaft 42 and the pin setter frame is started downwardly toward the alley bed. At the completion of the first whole revolution of the shafts 41 and 42, the sweeper has returned to normal position and the eccentric 81 is automatically released from the shaft 42. At this point in the operation the pin setter is in its lower position and is depositing the pins upon the alley bed. The pin setter returns empty and arrives at its upper or normal position at the completion of the next half revolution of the shaft 42, at which point the eccentric 44 is released and the new set operation is completed.

The dead wood operation consists of lifting the pins left standing on the alley bed by magnets carried by the pin setter, then sweeping the alley of the fallen pins and thereafter replacing the pins lifted by the pin setter upon the alley bed. In this operation the pin setter frame must first descend to pick up the standing pins, and this descent is accomplished during the first half revolution of the shaft 42, during which time the eccentric 44 is locked to the shaft 42 and the eccentric 81 governing the sweeper is inoperative. At the completion of the first half revolution, the eccentric 81 is engaged with the shaft 42 and the sweeper starts rearwardly to remove the fallen pins and the pin setter begins its upward movement with the standing pins. The pin setter reaches its upper position and the sweeper the rear of the alley at the completion of the first revolution. Both eccentrics are still locked to the sleeve 42 and the sweeper returns as the pin setter descends to return the standing pins. At the end of the first half of the second revolution, the sweeper is in normal position and the eccentric 81 is automatically disconnected from the shaft 42. At this point in the operation, the pin setter is replacing the standing pins and the eccentric 44 remains locked to the shaft 42, during the remaining half revolution to carry the pin setter back to normal position again.

The shaft 42 is caused to make two revolutions with the shaft 41 at each operation of the machine by a cylindrical portion 91 on a gear 92 carried by a stub shaft 93 (Fig. 12) supported by a suitable bracket on the frame 24. The gear 92 meshes with the pinion 94 keyed upon the shaft 42, the ratio between the pinion and the gear being 1 to 2, so that the gear will make one revolution for each two revolutions of the shaft 42. In the cylindrical face of the portion 91, a recess 95 is provided in which a roller 96 rotatably secured on the free arm of the clutch lever 97 rests, while the clutch 43 is thrown out or disengaged. When the clutch lever is moved to throw the clutch in, the roller is withdrawn from the recess 95 and the rotation of the shaft 42 rotates the gear 92 and the cylindrical portion 91 through the gear. The roller 96 rides upon the cylindrical face 91 and prevents movement of the clutch lever to throw the clutch out until the shaft 42 has made two complete revolutions, and the gear 92 one complete revolution at which time the recess 95 is again in position to receive the roller 96. The spring 98 normally holds the roller 96 in the recess 95 and maintains the clutch in thrown out position. A magnet 99 having a movable armature 101 connected with the free arm of the lever 97 is provided to withdraw the roller 96 from the recess 95 against the resistance of the spring 98 to throw the clutch in.

In order to normally lock the eccentrics 44 and 81 to the shaft 42 they are provided with recesses 113, 114 respectively, in the hubs 44' and 81' for the reception of collars 111, 112 keyed to the shaft 42. Pins 118, 119 extend through the apertures 116', 117' in the hub, and into one of diametrically arranged recesses 116, 117 in the collars 111, 112. Outward movement of these pins will withdraw them from the recesses 116, 117 and permit the eccentrics to remain stationary while the shaft 42 rotates. It will be noted that having withdrawn one of these pins it cannot again lock the eccentric to the shaft 42 until the shaft has made half a revolution and the aperture diametrically opposite the one from which the pin was withdrawn is in place to receive it. It is therefore sufficient if the pins be positively pulled from the collars momentarily. The imperforate portion of the collars prevent re-engagement by the pins throughout the succeeding half revolution. The necessary unlocking one of the eccentrics during the initial steps in each operation of the machine, the setter eccentric 44 in the new set operation and a sweeper eccentric 81 in the dead wood operation is accomplished electrically by magnets 123, 124 which attract large, soft iron heads 121, 122 respectively provided on the outer ends of the pins 118, 119. The pins 118, 119 are guided by the brackets 125 carried by the eccentrics 44 and 81. The magnets 123, 124 are suitably supported on the main frame, as indicated in 125' (Fig. 6).

A stub shaft 128 (Fig. 6) is carried by the bracket 129 carried by the main frame 24 and upon each end of the stub shaft is mounted a gear 133 meshing with pinions 134 on the shaft 42. The ratio between the gears 133 and the pinions 134 is 1 to 2, so that the gears 133 will make one complete revolution for each two revolutions of the shaft 42. The shaft 128 also carries adjacent to the gears 133 cam discs 135 having high operative portions 136 and 137 adapted to engage the enlarged heads 121, 122 of the pins 118, 119 to unlock the eccentrics 44 and 81 at the predetermined points in the operation of the device. The pins 118, 119 are normally held in position to lock the eccentrics 44 and 81 to the shaft 42 by the springs 141 and are moved to disengaged position only by the operation of the magnets 123 and 124 or the cams 135.

The clutch magnet 99 and the setter and sweeper magnets 123, 124 are connected to the push buttons or the switches located adjacent to the player's position by suitable circuits to be later described, and it is intended that the complete new set operation, or the dead wood operation will be accomplished by momentarily closing the proper circuits at the button or switch. It is therefore only at the beginning of either operation of the machine that the magnets 123, 124 will be energized, and this should occur at the same time that the clutch magnet 99 throws the clutch 43 into engaged position. When it is desired to make a new set, the pin setter remains inactive during the first half revolution of the shaft 42 or while the sweeper is clearing the alley. The magnet 123 is so connected in the new set circuit that this magnet is energized and the pin 118 withdrawn from the aperture 116 in the collar 111 as the shaft 42 starts to turn, thereby delaying the action of the setter until the shaft 42 has completed a half revolution at which time the pin 118 enters the aperture diametrically opposite the one in which it formerly rested, and the pin setter starts downwardly. The sweeper eccentric 81 remains locked to the shaft 42 until the end of the first revolution of the shaft 39, at which time the sweeper has completed its work and is again in normal position. It is then unlocked and remains idle during the second or last revolution. This is effected by the cam 137 which engages the head 122 of the pin 118 and moves the pin outwardly and prevents its entrance into the next aperture 116 which presents itself at the end of one and one half revolutions whereby the pin is held inoperative until it may enter the aperture in which it normally rests. After the shaft 42 has completed one and one-half revolutions, the high portion 136 of the cam disc 135 engages the head 121 to retract the pin 118 and unlock the eccentric 44 from the shaft 42. The gears 133 move continuously through the last half revolution of the shaft, and move the high portions 136, 137 past the heads 121, 122 of the pins so that the apertures in which the pins are normally engaged while the machine is idle may receive them at the completion of the second revolution of the shaft 42. It will be apparent from the foregoing that the entire new set operation is completed in one and one-half revolutions of the shaft 42, sweeper and pin setter both moving during the second half of the first revolution.

During the removal of dead wood it will be apparent that the eccentric 44 must be locked to the shaft 42 throughout two complete revolutions of the shaft as the first half of the revolution carries the pin setter down into position to lift the standing pins, the second half raises it and the standing pins above the alley bed (the pin setter coming back to normal position with the pins), the third half revolution returns it in position to replace the pins and the forth and last half revolution moves it back into normal position again ready for the next operation of the machine. During the removal of the dead wood the pin 118 is not withdrawn from the aperture in the collar 112 in which it normally engages.

In the removal of dead wood the action of the sweeper must be delayed until the pin setter frame has picked up the standing pins or during the first half revolution of the shaft 42, and to this end the magnet 123 is energized when the dead wood button or switch is pressed by a player so that the magnet attracts the head 122 of the pin 119 and permits the aperture in which the pin normally rests to pass the end of the pin so that when the circuit energizing the magnet is broken, the inner end of the pin will ride on the outer face of the collar 112 until the second aperture is in position to receive the pin, at which time the pin setter is at the lower point in its travel, and is about to return to the upper position with the standing pins. The pin then locks the eccentric 81 to shaft 42 throughout a complete revolution at the end of which time the rear end of the cam 137 is in position to engage the head 122 of pin 119 and withdraw the pin from locking position, the pin riding upon the outer face of the collar 112 throughout the last half revolution of the shaft 42, and then entering the aperture 117 in which the pin normally rests. In this operation the pin setter is in substantially continuous action throughout both revolutions. It ascends with the standing pins while the sweeper is moving rearwardly to sweep the alley and descends to replace them while the sweeper is moving forwardly and back to normal position, thereby effecting the desirable saving in the time required for the removal of dead wood.

As has well been described, the driving rod 54 of the pin setter frame is normally in the lower end of the slot 53 of the bell crank lever 47. This is the position it occupies during the removal of dead wood, in which it gives the short travel to the pin setter. When, however, a new set is to be made, a long travel of the pin setter is required, and the end of the driving rod 54 connected with the bell crank lever is raised by the first action of the control for the sweeper, which as has been stated, precedes the action of the pin setter frame and its control. The rod 66 is connected at its lower end to the arm 151 on the strap 82 and passes through a guide 152 on the frame 24 adjacent to its upper end. The extreme upper end of the rod 66 is enlarged, as indicated at 153 for contact with the roller 154 carried by the driving rod 54. When the new set button is pressed, the first half revolution of the shaft 42 operating the eccentric 81 causes the rod 66 to raise the driving rod 54 from the position shown in Fig. 6, and carry the pin 55 to the upper end of the slot 63. As the rod 66 moves upwardly, the link 63 permits the spring 61 to move the lever 58 and cause the hook 57 to secure the pin 55 in this upper position. The driving rod 54 is held in this position until the parts return to normal when the link 63 will move the hook 57 out of the path of the pin 55 and permit it to descend to the position shown in Fig. 6. The rod 66 can only move the driving rod 54 when the roller 154 is aligned with the enlargement 153. Consequently during the dead wood operation when the bell crank is operated to give the pin setter the short movement before the sweeper is brought into action, the roller 154 will not be in position to be operated upon by the enlargement 153 when in the succeeding step the eccentric 81 moves the strap 82 to communicate motion to the sweeper.

The rack 56 is held in engagement with the gear 35 by a saddle 157 consisting of side plates 158 loosely journaled on the shaft 33 and connected at their free ends by pintles forming bearings for the rollers 159 which bear upon the upper surface of the rod 54. A similar saddle 157', holds the rack 84 in engagement with the gear 85.

The balls and pins are delivered from the alley bed and the gutters into the pit generally indicated at 165 (Fig. 38) which has a roof-shaped bottom inclining towards each side, as shown at 166 and 167 and front and back portions 168 and 169 also inclining to form pockets at about the center of each side of the pit. This arrangement of the walls of the pit causes the pins and balls to be delivered to the pair of elevating wheels 170 and 171, which rotate counterclockwise when viewed from the right hand side of the machine, as indicated by the arrow in Fig. 1. These wheels are driven by the sprocket chains 172 from a shaft 173 having the worm 174 on one end thereof, which is driven by the worm wheel 175 carried by the power shaft 39 slightly to the rear of the gearing 40 (Figs. 6, 8 and 32). Each of these wheels is equipped on its inner side at the periphery with a suitable number of pockets 176 for pins, and 177 for balls. A guard plate 178 mounted slightly to the inside from each of these wheels and shaped as indicated in Fig. 42 serves with the aid of the curved guides 179 to retain the pins and balls within their respective pockets during the travel from the bottom of the pit to the points of delivery. Each of the pockets 177 for balls is equipped with an outlet 180 too small to permit the passage of balls, but ample to allow any pins caught in these recesses to escape.

Figure 33:
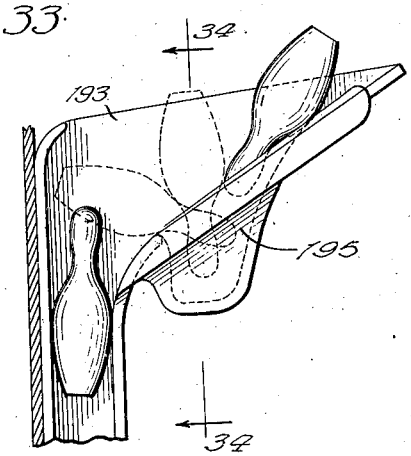
Figure 34:
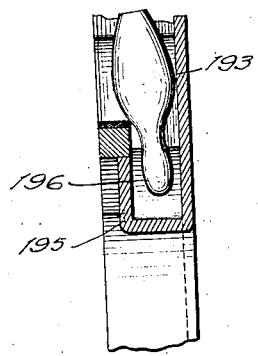
Figure 35:
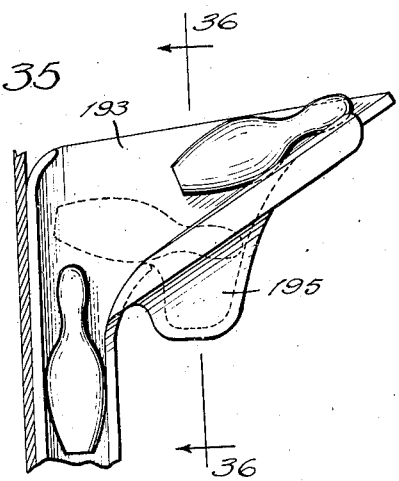
Figure 36:
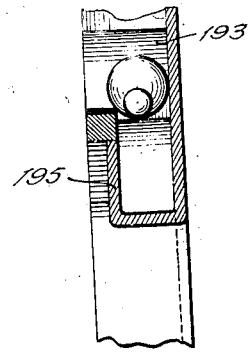

In order to insure the delivery of the balls at the desired point, I provide each wheel or rotary element 170 and 171 with a pair of ejectors 181 here shown as comprising an arm 182 pivoted at 183 and having an inclined and curved head 184 normally lying adjacent to the bottom of the ball recesses. A spring 185 connected to the arm 182 and to a relatively fixed bracket 186, tends to hold the ejector in this position. Each arm 182, however, is provided with a lever 186 equipped with a roller 187 adapted to traverse the periphery of a cam 188 fixed with respect to the rotating elements. The curvature of this cam is so designed that as a pocket 177 reaches a suitable point of delivery the ejector head 184 is forced outwardly in the direction it is desired to have the balls take. In the device shown the ejectors on the right hand of the machine direct the balls into a trough 189 leading to the return track 190 (Fig. 37) while those on the left deliver the balls directly to the track 190 or to a suitable trough not shown, leading thereto. The pin recesses 176 slope away as indicated at 191 in Figs. 41 and 42 so that when the pins reach the cut away portions 192 of the guards 178, they fall into the chutes 193 leading to the pin seats 194 from which the pins are lifted on their return to the pin setter. Each of chutes 193 is equipped with a reversing pocket 195 shown in detail in Figs. 33, 34, 35 and 36. If a pin comes down a chute 193 with its butt up, the head will enter the reversing pocket as indicated in Fig. 33 so that the pin will be reversed and proceed to the pin seat right end up. The construction of these reversing pockets is very simple and consists essentially in making the depression 196 in the bottom of the chutes 193, a little greater in depth than the length of the small portion of a pin, and a little less in width than the large diameter of the pin, substantially as shown in Fig. 34.

The pins are elevated from the seats 194 and delivered to the magazine by a pair of magnets 197 shown enlarged in Figs. 30 and 31. Each of these magnets comprises a solenoid 198 wound between suitable insulators 199, on a core 200. The core of each magnet has a longitudinal passage for a movable armature 201 equipped at its upper end with one contact of a switch 202 and its lower end with a suitable head 203, for contacting with the metal inserts in the ends of the pins. A binding post 204 (Fig. 31) carries a contact 205 adapted to co-operate with the contact 202 to close the circuit in which the magnet is connected. By this arrangement the magnet is not energized unless there is a pin on the seat 194 to be elevated.

The magnets are connected to the ends of a chain 206 running over a sprocket 207 mounted on a shaft 208 (Figs. 27 and 32) carrying a pinion 209 meshing with the gear 210 on a shaft 211 having the pinion 212 meshing with the rack 213. This rack 213 is driven by a crank 214 secured to the rear end of the shaft 39. The shaft 39 carries a pair of cams 215, 216 which operates switches to break the circuit of each magnet as it reaches the uppermost position, as indicated in Figs. 6, 9 and 32. Overhanging the magnets 198 is a bracket 217 carrying a shaft 218 on which is pivoted a pair of kickers 219. Each kicker 219 is in the form of a bell crank lever having a long arm 220 equipped with curved pad 221 for engagement with the pins, and a short arm 222 adapted to be struck by a buffer 223 carried by each magnet. As shown in Fig. 30 these buffers comprise rods 224 slidably mounted on the magnets and equipped with springs 225 adapted to absorb the shock when the ends 226 strike the short arms of the kickers.

The shaft 39 is driven continuously by the motor 37 and the crank 214 reciprocates the rack 213, which through the gearing described causes the magnets to alternately ascend and descend. When a magnet reaches its lowermost position, if a pin is on the seat 194, the armature 201 will be raised to close the switch 202, 205 which will energize the magnet, causing the armature to be held in raised position and the pin to be carried upwardly with the magnet. When the magnet reaches its uppermost position as indicated in Fig. 6, the cams 215, 216 will break the circuit just as the buffer 223 strikes the short arm 222 of the corresponding kicker 119 so that as the pin is released from the magnet, it is directed into the chute 227 leading to the magazine. The switches opened by cams 215, 216 close automatically as soon as the cams are out of the way, and the circuit is ready to be closed again when the pin on the seat 194 raises the armature, as above described. This mechanism operates continuously and the ratio between the elevating wheels 170 and 171 and the magnets 191 is such that the pin seats 194 are always cleared before the succeeding pins come down the chutes 193, thereby preventing any accumulation of pins causing a jam at the seats 194.

I have shown each magnet equipped with a cup-shaped element 228 adapted to direct the head of the pin on a seat 194 into proper position with relation to the armature 203.

Figure 3:
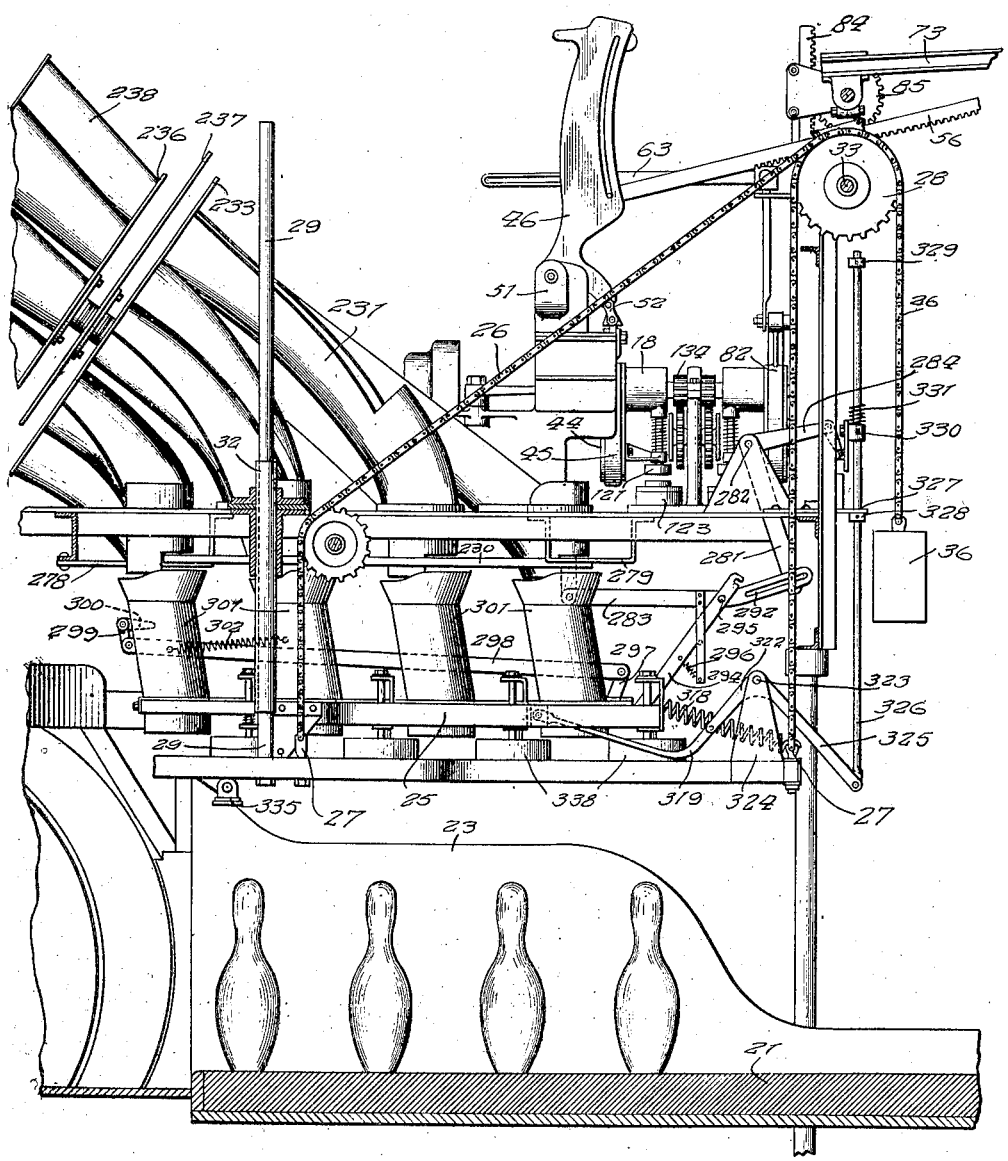
Fig. 3 is an enlarged side elevation of the front portion of the machine.

The magazine includes the pin supporting frame 230 shown in detail in Figs. 19 and 20 and located in the machine just below the lower ends of the guides 231. This frame is provided as a support for the set of pins to be held in readiness for discharging into the pin setter 25 as soon as the latter returns to normal elevated position from a new set. These guides are curved as indicated in Fig. 3, and may be of any suitable construction, so long as they direct the pins to the proper places and retain them in position on the pin supporting frame 230. The upper ends of these guides are secured in openings 232 in a plate 233. The plate 233 carries a suitable bearing 234 for the lower end of the shaft 235 on which a rotary creel 236 is keyed and a pin retainer 237 is rotatably mounted. The creel 236 is equipped with ten pockets or cages 238 adapted to receive the pins from chute 227. The upper end of the shaft 235 is journaled in a bracket 239 and equipped with ratchet wheels 240 and 241. The ratchet wheel 241 is controlled by a pawl 242 carried by an arm 243 pivoted at one end on the shaft 235 and at its other end to a connecting rod 244 having its lower end pivoted to a crank 245 on a shaft 246 driven from the shaft 39 through the gearing 247. The pawl 242 is heavier at the end 248 and is therefore automatically disengaged from the ratchet 240 during the downward movement of the arm 243. This heavier end 248 lies in the range of the magnet 249 supported on the arm 243 and in circuit with the magnets 197. If a magnet 197 is energized, the magnet 249 is also energized and raises the heavy end 248 of the pawl 242 so that the pawl will engage with the wheel 241 and cause the shaft 235 to rotate and bring an empty pocket or cage 238 in line with the chute 227.

The ratchet wheel 240 is here shown as the inner portion of the ratchet wheel 241. It is provided with a series of notches 250 adapted to receive tooth 251 carried by a pawl 252 pivoted at 253 on a suitable fixed support and urged into engagement with the ratchet wheel by the spring 254. The function of this pawl and ratchet is to secure the shaft 235 in fixed position. The front end 255 of the pawl 242 is broad and overhangs the pawl 252 when the parts assume the position to the right of that shown in Fig. 29. As the arm 243 approaches the position in Fig. 29, the pawl 242 forces the pawl 252 down to free the shaft 235, and then through engagement with the teeth of the ratchet 241 rotates the shaft to bring the next empty pocket into line with the chute 227. The pin retainer 237 is freely mounted on the shaft 235 but is limited in its movement relative to the creel 238 by the pin and slot connection 256, and this limited movement is resisted by the spring 257, Fig. 25. Normally the pin retainer is held in the position shown in Figs. 22 and 25, so that the radial elements 258 are aligned with the bottoms of the pockets 238 of the creel 236 and prevent the pins from passing into the guides 231. The creel is provided with an arm 259 (Figs. 21, 22 and 25,) which is normally seated in a notch 260 in a pivoted treadle 261 carried by the upstanding ears 262 on the pin retainer 237. The pressure of a spring 271 forces the lower end 263 of the treadle 261 into contact with a trip 264 pivoted at 264' on the pin retainer and adapted to come in contact with the abutment 265 carried by the main frame 24. This trip is equipped with a wedge 266 which when the trip is moved to the position shown in Fig. 26, will raise the lower end of the treadle 261 and free the arm 259 from the notch 260 permitting the creel 236 to rotate relative to the pin retainer a sufficient amount to discharge the pins from the pockets 238 into the guides 231. A catch 267 pivoted at 268 on the pin retainer and held by spring 269 limits the movement of the trip 264 to that position shown in Fig. 26. This catch, however, is provided with an upwardly directed arm 270 lying in the path of the arm 259 so that as the creel rotates the catch 267 is released and permits the trip 264 to move about its pivot 264' and clear the abutment 265. At this juncture the spring 257 will return the pin retainer to the position shown in 22 and 25 and the springs 269, 271, 272 return the catch 267, the treadle 261 and the trip 264 to the normal positions also shown in Fig. 25.

As illustrated, the bearing 234 comprises a housing 273 providing the annular wearing surface 274 for the resiliently mounted pads 275 carried by the disc 276 secured to the lower end of the shaft 235. The housing 273 may be secured to the disc 233 by bolts 277 or otherwise, as desired. It will be understood that the creel 236 is only rotated when a magnet 197 delivers a pin to the chute 227 as the magnet 249 is in the same circuit as the magnets 198 and will not be energized to operate the pawl 242 except when a pin is in position to close the contacts 202, 205. The tripping mechanism by which the creel 236 is permitted to rotate relative to the pin retainer 237, is so located that it operates only when the tenth pin is received, so that as this last pin of the set comes down the chute 227, the creel is moved to position to discharge the pins into the guides 231 and the last pin passes from the chute 227 directly through the aligned pocket of the creel and into its guide.

Figure 2:
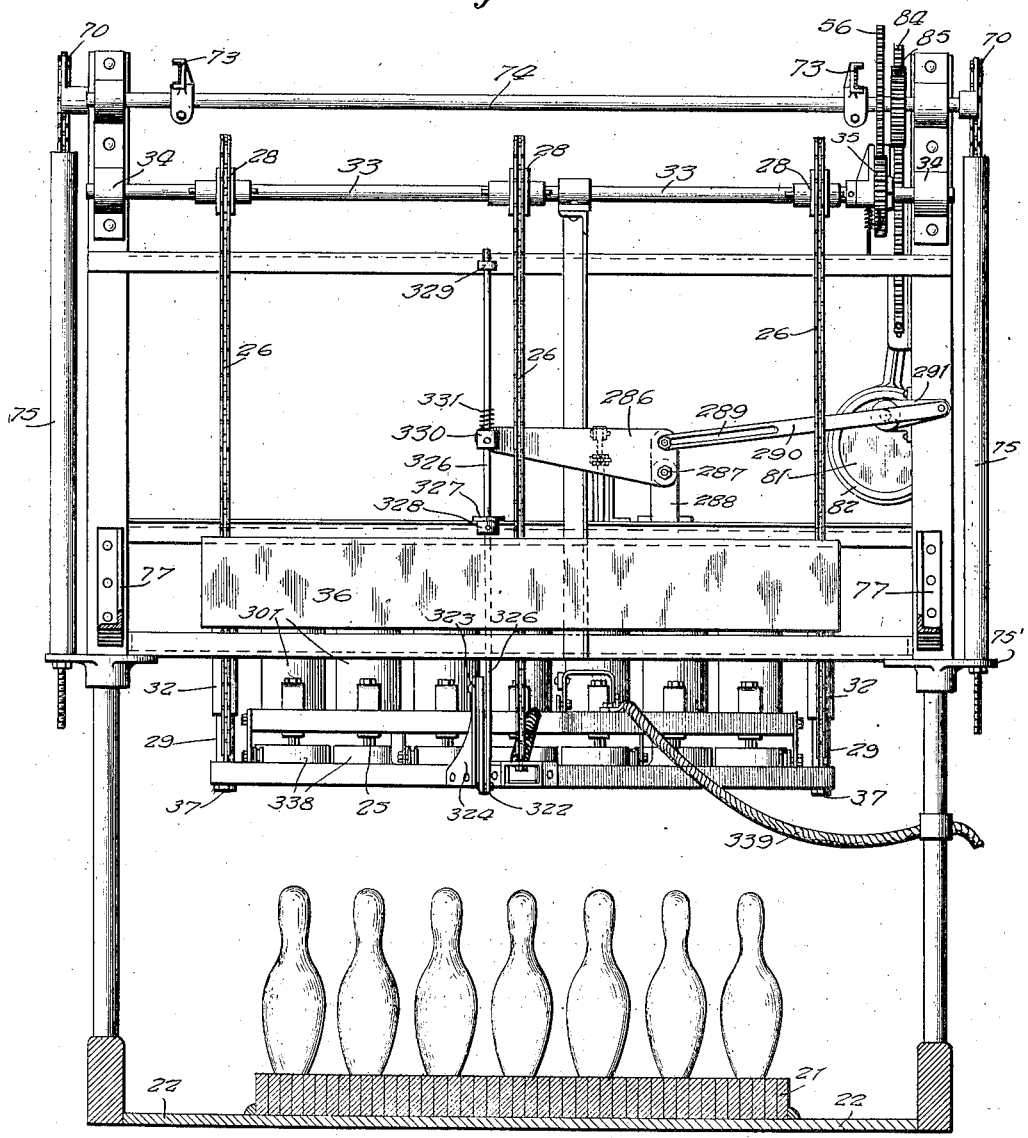
Fig. 2 is a front elevation with the alley and the sweeper in sections.
Figure 4:
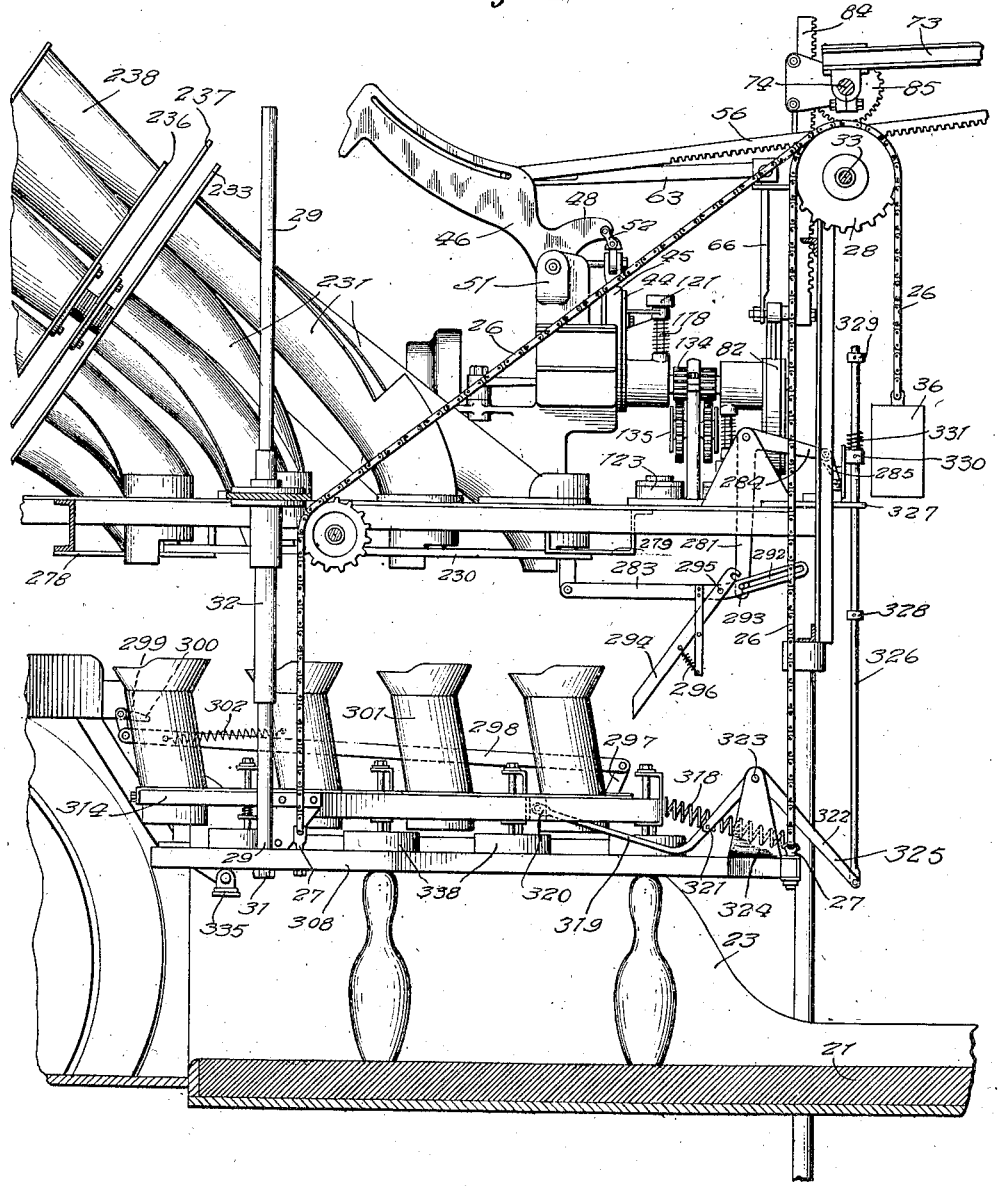

The pins passing from the creel into the guides descend onto the pin supporting frame 230 and are held in the positions indicated in Fig. 5. This pin supporting frame is carried by brackets 278 at the rear and 279 at the front, which allow it to have a limited horizontal motion lengthwise to the machine. A spring 280 normally tends to hold the pin supporting frame in the operative position in Fig. 19, and resists movement to the position shown in Fig. 20 in which it permits the pins to descend into the pockets of the pin setter. The pin supporting frame 230 is operated to release the pins by a bell crank lever 281 pivoted at 282 on a bracket carried by the frame 24, and having one arm connected with the frame 230 by the link 283, (Fig. 4). The other arm 284 of this bell crank is connected by a link 285 with a lever 286 (Fig. 2) pivoted at 287 on a bracket 288 carried by the frame 24. This lever has a pin and slot connection 289 with a connecting rod 290 driven by a crank 291 on the end of the shaft 42. The crank 291 is keyed or otherwise secured to the shaft 42 in position to operate the pin supporting frame 230 just as the parts come to rest at the end of a new set operation.

It is, of course, necessary to provide some means that will prevent the movement of the pin supporting frame 230 except under the desired conditions. As illustrated, I have provided the link 283 with a slot 292 in which a pin 293 carried by the bell crank 281 is adapted to move freely when the pin supporting frame 230 should remain in the position shown in Fig. 19. A latch 294 pivoted at 295 on the link 283 is adapted to secure the pin 293 in the rear end of the slot 292 so that the movement of the bell crank 281 will be effective when it is desired to move the frame 230. A spring 296 normally holds this latch 294 disengaged from the pin 293, and the latch is engaged only when the pin setter is empty. This is insured by providing the pin setter with a rocker 297 suitably pivoted thereon, and connected by a link 298 with a bell crank 299 having one lever arm 300 passing through a slot into one of the pin pockets 301. A spring 302 tends to move the rocker forwardly so as to engage with the lower end of the latch 294 on the upward movement of the pin setter.

The normal position of the pin setter, pin supporting frame 230, and associated parts is shown in Fig. 16. If this position is resumed at the end of a new set operation, when the crank 291 reaches approximately the position shown in Fig. 2, the pin supporting frame will be moved forwardly through the operation of the bell crank 281 and the pins located in the position shown in Fig. 5 will descend by gravity into the pockets 301 of the pin setter. The movement of the bell crank 281 will move the end of the latch 294 to the position indicated in Figs. 17 and 18 and when the pins enter the pockets 301, the movement of the bell crank 299 will rock the rocker 297 rearwardly and permit the spring 296 to move the latch 294 to the position shown in Fig. 3.

If the button is pressed for a dead-wood operation, the pin setter will descend to the position shown in Fig. 4, rise again to normal position to permit the sweeper to remove the fallen pins, descend again to the position shown in Fig. 4 to replace the standing pins, and finally ascend a second time to normal position. The pin resting against the arm 300 of the bell crank 299 and a spring 296 serve to hold the latch 294 and the rocker 297 in position to pass without engagement during each of the upward movements of the pin setter, so that the pin 293 is left free to move in the slot 292, therefore the crank 291 cannot shift the pin supporting frame 230 to permit any additional pins to descend into the pin setter.

If the button is pressed for a new set operation, the sweeper clears the alley, the pin setter descends and sets the ten pins on the spots. The arm 300 of the bell crank 299 being released from the interference of the pin in the pocket the spring 302 moves the rocker 297 forwardly into position to engage the lower end of the latch 294 as the pin setter rises to normal position. By the time the crank 291 becomes effective, the latch 294 has secured the pin 293 in the rear end of the slot 292 and the pin supporting frame 230 is shifted to permit the new set of pins to drop into the pin setter.

The motion of the crank 291 communicated to the bell crank 281 is just sufficient to move the latch 294 to the position indicated in Figs. 17 and 18. If no pins are on the pin supporting frame, it is desirable to hold the parts inoperative until pins are received, otherwise the button might be pressed for a new set operation when no pins were in the pin setter with the result that the machine would be operated to no effect. To take care of this emergency I have provided a switch 303 on one of the forward brackets 279, (Fig. 19) which is automatically opened when the pin supporting frame is moved to the position shown in Fig. 20 and automatically closed by the arm 304 on the pin supporting frame when it returns to the position shown in Fig. 19. By placing this switch in the circuit with the magnets 99, 123 and 124 as indicated in Fig. 47, the pin setter and sweeper mechanism will be rendered inoperative when the pin supporting frame 230 is in the position shown in Fig. 20 and cannot be operated until the pin supporting frame returns to normal position. The result is that when the pin setter rises to its normal position, and no pins are on the pin supporting frame, the latch 294 remains in the position shown in Figs. 17 and 18, and the pin setter and sweeper mechanisms are inoperative until the set of pins descend from the creel into the pin setter, whereupon the movement of the bell crank 299 by a pin engaging the arm 300 rocks the rocker 297 and permits the latch to free the pin 293 and permit the spring 280 to return the pin supporting frame 230 to normal position and close the switch 303.

The pin setter 25 (Figs. 14 and 15) is composed of a pin setter frame 305 and a pocket carrying frame 306 mounted to move lengthwise thereto. The pin setter frame is substantially triangular in formation, as indicated in the drawing, and is composed of side pieces 307, 308, a rear end piece 309, and a plurality of transverse pin supporting strips 310. As shown, this frame is made of commercial shapes but obviously may be constructed in any suitable manner. The pin setter frame is equipped with four short lengths of rail 311 upon which grooved rollers 312 carrying the pocket supporting frame are adapted to roll. These rollers are suitably mounted in brackets 313 depending from the pocket supporting frame. This frame is also substantially triangular in shape and comprises the side pieces 314, the end piece 315, a plurality of transverse strips 316, and a plurality of longitudinal strips 317. The pin pockets 301 are suitably mounted on this frame and arranged in the triangular form in which the pins are customarily set on the bowling alley. A compression spring 318 normally holds the pin pockets 303 aligned with the pin supporting strips 310 so that the pins in the pockets are prevented from descending upon the alley until the pocket carrying frame is moved forwardly on the pin setter frame by proper mechanism. A bent link 319 is pivoted at 320 to the pocket carrying frame at one end, and at 321 to a bent lever 322 fulcrumed at 323 on the bracket 324 carried by the front end of the pin setter frame. The longer arm of this bent lever 325 is pivotally connected to the lower end of a rod 326 running through the guide 327 and equipped with the abutments 328 and 329. The upper end of this rod passes through a suitable abutment 330 here shown as carried by the lever 286. The length of the rod 325 is such that when the pin setter approaches or comes in contact with the bed of the alley, the pocket supporting frame is moved forwardly on the pin setter frame, as indicated in Fig. 5, so as to permit the pins to freely slide from the pockets 301 onto the spots on the alley. The pockets 301 are preferably inclined slightly to the rear, as indicated in the drawings so as to permit the pockets to clear the pins as the pin setter ascends from the alley bed, and the pockets move rearwardly with the pocket carrying the frame along the pin setter frame. A spring 331 may be provided between the abutments 329 and 330 to relieve shock. In order to steady the pin setter as the pins are being placed on the spots, I prefer to equip the pin setter frame with a plurality of steadying devices 332, which consist principally of a bent lever 333 pivoted at one end to the pin setter at 334, carrying at its other end a pivoted shoe 335 equipped with a suitable pad 336 and yieldingly held in the position shown in Fig. 14ᵃ by a spring 337. Any suitable number of these steadying devices may be employed and they may be distributed about the pin setter frame in any suitable manner.

The pocket supporting frame carries 10 magnets 338 arranged in triangular form corresponding to the spots on the alley which are used for elevating the pins from the alley bed preparatory to clearing the alley of deadwood in what has been heretofore described as the deadwood operation. These magnets are wired in the customary manner, as will be understood by those skilled in the art. As illustrated the wires are brought to the pin setter through the cable 339. It will be noted that the magnets are normally in the spaces between the pin supporting strips 310 of the pin setter frame so that in the deadwood operation when the pin setter is lowered through the short travel, these magnets will come into contact with the heads of the standing pins. It will also be obvious that the magnets may be yieldingly supported on the pocket carrying frame, in any suitable manner.

Inasmuch as the magnets are used during a portion of the deadwood operation, only, a saving in current can be effected by providing means for automatically opening the circuit at all other times. It will be recalled that during the deadwood operation the sweeper is preceded by the pin setter a length of time corresponding to one half revolution of the shaft 42 or during a quarter revolution of the gear 92, and that the magnets need to be energized through a period corresponding to one half revolution of the gear 92. I therefore provide a switch 340 in the circuit of the magnets 338 and put it under the control of a cam 349 carried by the gear 92 (Figs. 11 and 12). This cam corresponds in length to one-half of the periphery of the flange 350 on the gear 92, and operates a lever 351 pivoted at 352 which controls the switch lever 353 operating a switch 340. This will insure that the magnets are not energized except during the second half of the first and the first half of the second revolution of the shaft 42.

Inasmuch as the magnets are not needed at all in the new set operation it is desirable to open the circuit throughout the entire new set operation. This is accomplished by a switch 354 carried by the shaft 74 and operated by the saddle 157 substantially as described in my prior Patent No. 1,190,646, July 11, 1916, Figs. 16 and 17. The arrangement of this switch is such that when the operating rod 54 is moved from the position shown in Fig. 6 to the new set position, the switch will be opened and will remain open until the end of an operation.

The fact that the clutch 43 cannot be disengaged for a predetermined movement of the shaft 42, and the pins 118, 119 cannot re-engage the eccentrics 44 and 81 with the shaft 42 until after half a revolution, makes it necessary for the circuit including the magnet 99 and the magnets 123, 124 to be closed for only a short space of time. To save current, I therefore provide means for automatically opening the circuit as soon as the shaft 42 begins to rotate. This is accomplished by providing a groove 355 in the flange 350 of the gear 92, and mounting a lever 356 so that one end will co-operate with the groove to control a switch lever 357 operating a switch 358 (Fig. 47). For a short length the groove 355 is made sufficiently deep, as indicated at 359 to permit the switch 358 to close. This permits the circuit in which these three magnets are connected to be closed for a sufficient length of time to control the pins 118, 119 and the clutch 43, after which the circuit is opened and the predetermined cycle of operations is automatically performed without the use of any additional electric current.

The buttons controlling the deadwood and new set operations are connected by a lever 360 as shown in Fig. 49 so as to prevent both buttons being operated at once. When the new set button is pressed down, the deadwood button is raised, magnets 123 and 99 are energized and the cycle constituting the new set operates automatically and without any control by the player.

In the nature of things it will sometimes happen that the new set button will be pressed when the deadwood button should have been pressed so that the alley will be cleared and a new set of ten pins spotted thereon. Also, many players like to practice with certain combinations of less than ten pins. For these reasons I find it desirable to provide means for both individually and collectively energizing the pin magnets 338. This is accomplished by inserting in the circuit of the magnets, 10 button switches 361 (Figs. 47 and 52) and means here shown as a strip 362 for short circuiting these switches. The new set and deadwood buttons are preferably mounted in a post or block 363 at the player's end of the alley, and I prefer to mount the switches 361 in this same post and provide a lock so that the proprietor may permit the switches 361 to be used or refuse to let them be used, as he may see fit. As shown, the magnets are connected individually by wires 364 with individual strips 365 carried by the post 363. Similar strips 366 carried by the hinged door 367 make contact with the strips 365 as indicated in Figs. 51, 53 and 54. The strips 366 are connected by individual wires 368 with a plurality of contacts 369 lying opposite, a similar set of contacts 370 connected by wire 371 with one side of the line. Strips 369 and 370 are carried by the door 367 in the relationship indicated in Fig. 52. A series of buttons 372 are provided with shanks 373 in continuous electrical contact with the strips 370. Each shank 373 carries a disc 374 adapted to make contact with the corresponding strip 369 when the button 372 is pressed down. The shanks 373 are extended beyond the shanks 374 as indicated at 375 and when the lid is closed, rest against a solid portion of the post 376 as indicated in Fig. 52, so as to break the contact between the discs 374 and the strips 369. When it is desired to individually energize the magnet the door 367 is swung to the position indicated in Figs. 50 and 53, and the proper buttons pressed down to complete the circuit. Then, by pressing the deadwood button, the particular pins desired will be raised by the pin setter while the remaining pins are swept into the pit and upon the downward movement of the pin setter, the selected pins will be replaced on the spots on the alley. The strip 362 lies transversely across the door, as indicated in Figs. 53 and 54, and when the door is closed it makes contact with all of the strips 365 thereby short-circuiting all of the switches controlled by buttons 372, as will be readily understood from Fig. 54 and the diagram in Fig. 47. The door 367 may be provided with a suitable lock so that the proprietor may prevent use of the buttons 372 or permit their use as he may desire.

The electrical equipment will, of course, be fitted with proper fuses and other devices necessary to efficiency and safety. I have shown in Fig. 47 by way of illustration, a pair of blow-out coils 377 and 378 in the circuits of the pin setter magnets 338 and the magnets 99, 123 and 124.

It will be noted that the shaft 74 by which the sweeper is operated is located above the shaft 33 and substantially at the top of the frame 24. This permits the use of long arms 73 and 72 which gives the sweeper a much more satisfactory movement than the construction shown in my prior patents. The rods 76 are comparatively short and serve to guide the sweeper directly from the position shown in Fig. 1 to the dotted line position shown in Fig. 43 from which it rolls along the alley to the solid line position shown in Fig. 43 completely clearing the bed and both the gulleys, as will be clear from inspection of Fig. 45. I find it very desirable to provide the sweeper with the rollers 381 which support the bottom edge of the sweeper just clear of the surfaces of the bed and the gulleys.

It will be obvious that various changes may be made in the devices, mechanisms and circuits, described without departing from the spirit or scope of the invention or sacrificing any of its material advantages, the forms hereinbefore disclosed being merely preferred embodiments thereof.

I claim:

1. The combination of a bowling alley having a bed and a pit, a sweeper adapted to move along said alley toward said pit, a frame rotatable about an axis above said alley, links connecting said frame and said sweeper, and means loosely connected with said sweeper for directing it toward said pit upon the rotation of said frame.

2. The combination of a bowling alley having a bed and a pit, a sweeper adapted to move along said bed toward said pit, and means for operating said sweeper comprising a frame adapted to swing up and down above said alley, links connecting said frame and said sweeper, and means pivoted in front of the axis of said frame and loosely connected with said sweeper for directing said sweeper toward said pit upon the downward movement of said frame.

3. The combination of a bowling alley comprising a bed and a pit, a sweeper adapted to move along said bed, means for operating said sweeper including a swinging frame, links connecting said frame and said sweeper, and means to swing said links toward said pit during the initial movement of said frame comprising pivotally mounted elements connected with said sweeper during said initial movement and disconnected therefrom during an intermediate portion of a cycle of movements.

4. The combination of a bowling alley, a sweeper adapted to move back and forth along said alley, means for operating said sweeper comprising a frame mounted to swing above said alley, links connecting said frame and said sweeper, and a swinging element of less length than said links loosely connected to said sweeper to direct it along said alley.

5. The combination of a bowling alley, a sweeper adapted to reciprocate along said alley, a swinging frame mounted above said alley, a link connecting said frame and said sweeper, and pivoted control means loosely connected with said sweeper to guide it rearwardly along said alley.

6. The combination of a bowling alley, a sweeper adapted to move along said alley, a frame normally supported above said alley and adapted to swing downwardly and rearwardly to operate said sweeper, means for suspending said sweeper from said frame, and a pivoted control member loosely connected with said sweeper to guide it rearwardly upon the operative movement of said frame.

7. The combination of a bowling alley, a sweeper, a frame, means for suspending said sweeper from said frame, means for swinging said frame downwardly and rearwardly to operate said sweeper, a pivoted member disconnected from the sweeper during a portion of a cycle of movements of said sweeper and connected with said sweeper during another portion of said cycle for guiding said sweeper.

8. The combination of a bowling alley, a sweeper adapted to move along said alley, an operating frame mounted to swing back and forth above said alley, means for suspending said sweeper from said frame, and a pivoted control member having engaging means in the path of said sweeper adapted to automatically engage said sweeper to guide it along said alley.

9. The combination of a bowling alley, a sweeper adapted to reciprocate along said alley, a swinging frame mounted above said alley, a link connecting said frame and said sweeper, pivoted control means automatically engaging said sweeper to guide it rearwardly along said alley, and rollers adapted to support said sweeper when disengaged from said control means.

10. The combination of a bowling alley, a sweeper adapted to move along said alley, a frame normally supported above said alley, and adapted to swing downwardly and rearwardly to operate said sweeper, means for suspending said sweeper from said frame, a pivoted member for guiding said sweeper and disposed in the path of said sweeper so as to be engaged thereby during the forward movement thereof.

11. In a pin setting machine for a bowling alley, a pin setter including a pin setter frame, a pocket carrying frame movably mounted on said pin setter frame, a plurality of substantially tubular pin pockets carried by said pocket carrying frame, pin supports on said pin setter frame normally aligned with said pin pockets, means for yieldingly maintaining said pin pockets in alignment with said pin supports, and means for automatcally moving said pocket carrying frame relative to said pin setter frame to discharge the pins upon the alley.

12. In a pin setting machine for a bowling alley, a pin setter frame having transverse pin supports thereon, a pocket carrying frame mounted on said pin setter frame and movable lengthwise thereto, substantially tubular pin pockets on said pocket carrying frame, means for yieldingly holding said frame in position to align the pin pockets with the pin supports, and means for automatically moving said pocket carrying frame to release pins from said pockets.

13. In a pin setting machine for a bowling alley, a pin setter frame triangular in form, a pocket carrying frame also triangular in form mounted on said pin setter frame to move lengthwise thereto, pin supports on said pin supporting frame, substantially tubular pin pockets on said pocket carrying frame, magnets on said pocket carrying frame, and means to normally hold said pin pockets aligned with said pin supports.

14. In a pin setting machine for a bowling alley, a pin setter frame of triangular form having transverse pin supporting strips thereon, a pocket carrying frame also of triangular form supported on said pin setter frame and movable lengthwise thereto, a series of substantially tubular pin pockets in triangular formation carried by said pocket carrying frame, a series of magnets in the same triangular formation carried by said pocket carrying frame, each magnet being in front of the corresponding pin pocket, and means for normally holding said pin pockets in line with said pin supports.

15. In a pin setting machine for a bowling alley, a pin setter frame of triangular form, transverse pin supports thereon, a pocket carrying frame mounted on said pin setter frame and adapted to move lengthwise thereto, said pocket carrying frame having a series of transverse members and a series of longitudinal members, substantially tubular pin pockets mounted in the space between said longitudinal and transverse members, pin magnets carried by said pocket carrying frame, and means for normally maintaining said pin pockets aligned with said transverse pin supports.

16. In a pin setting machine for a bowling alley, a triangular pin setter frame having tracks thereon, a triangular pocket carrying frame having rollers mounted on said tracks, tubular pockets on said pocket frame, said pockets being of a diameter substantially equal to the largest diameter of the pins, pin supports carried by said pin setter frame, pin pockets carried by said pocket carrying frame, and a spring adapted to hold said pin pockets aligned with said pin supports.

17. In a pin setting machine for a bowling alley, a pin setter comprising a pin setter frame and a pocket carrying frame mounted to move lengthwise thereon, means for moving said pocket carrying frame to deposit pins on the alley, and independent means carried by said pin setter frame and pivotally secured thereto adapted to contact with the alley and steady the pin setter frame as the pins are deposited on the alley.

18. In a pin setting machine for a bowling alley, a pin setter comprising a pin setter frame, a pocket carrying frame mounted to move lengthwise thereto, pin supports on said pin setter frame, pin pockets on said pocket carrying frame, means normally holding said pin pockets in alignment with said pin supports, means to automatically move said pin pockets out of alignment with said pin supports as the pin setter approaches the alley, and a plurality of yielding steadying devices pivotally connected to said pin setter frame and adapted to steady the pin setter as the pins are spotted on the alley.

19. In a pin setting machine for a bowling alley, a pin setter adapted to move up and down above said alley and equipped with independent yielding steadying devices pivotally secured thereto adapted to contact with said alley and steady the pin setter while the pins are being spotted on the alley.

20. In a pin setting machine for a bowling alley, a pin setter adapted to spot pins on said alley and movable from an operative position adjacent to said alley to an inoperative position above said alley, and independent steadying devices pivotally secured to said pin setter adapted to engage the alley and steady the pin setter during the pin setting operation.

21. In a pin setting machine for a bowling alley, a steadying device for a pin setter comprising a lever pivoted at one end to the pin setter, a pad carried by the opposite end of said lever, and yielding means for pressing said pad against the alley when the pin setter is in operative position.

22. In a pin setting machine for a bowling alley, a rotatable element provided with a recess in its face adapted to receive a ball, guiding means to retain a ball in said recess during part of a revolution of said element, and pivoted means for ejecting a ball at a predetermined point.

23. In a pin setting machine for a bowling alley, a rotatable element provided with a recess in its face adapted to receive a ball, guiding means to retain a ball in said recess during part of a revolution of said element, and means carried by the rotatable element and movable relatively thereto for ejecting the ball laterally to the rotatable element.

24. In a pin setting machine for a bowling alley, a rotatable element provided with a recess in its face adapted to receive a ball, guiding means to retain a ball in said recess during part of a revolution of said element, movable means carried by said rotatable element for ejecting a ball from said recess, and a cam for actuating said movable means.

25. In a pin setting machine for a bowling alley, a rotatable element provided with a recess in its face adapted to receive a ball, guiding means to retain a ball in said recess during part of a revolution of said element, means carried by said element and movable relatively thereto for ejecting the ball from said recess, and fixed means for operating said last named means.

26. In a pin setting machine for a bowling alley, a rotatable element having a recess in its face adapted to receive a ball, guiding means to retain the ball in said recess during a part of a revolution of said element, an ejector pivoted to said rotating element and having an inclined face adapted to engage the ball to eject it from said recess, and means for operating said ejector.

27. In a pin setting machine for a bowling alley, a rotatable element provided with a recess in its face adapted to receive a ball, guiding means to retain said ball in said recess during a part of a revolution of said element, an ejector pivoted to said element, yielding means for holding said ejector in inoperative position, and a cam moving said ejector to eject the ball from said recess.

28. In a pin setting machine for a bowling alley, a rotatable element having a recess in its face adapted to receive a ball, and a recess in its face adapted to receive a pin, means co-operating with said rotating element to retain a ball and a pin in their respective recesses during a portion of a revolution of said element, and means pivoted to said rotatable element for ejecting the balls.

29. The combination of a bowling alley, a return track for balls, a chute for pins, a rotating element mounted adjacent to said return track, said element having separate recesses in its face for balls and pins, means co-operating with said rotating element to retain balls and pins in their respective recesses, and means movable relatively to said element for ejecting said balls from said rotating element onto said return track.

30. The combination of a bowling alley including a pit having a bottom wall inclining toward each side thereof, a pair of rotating elements mounted adjacent to the lower portions of said pit, each rotating element having recesses in its face to receive balls and pins, guides co-operating with said rotating elements to retain balls and pins in said recesses, a return track for balls adjacent to said guides, and pivoted means for ejecting balls from said rotating elements.

31. In a pin setting machine for a bowling alley, a rotatable wheel having its axis of rotation disposed transversely of the alley, and having a recess in its periphery to receive a pin, and lateral and circumferential guides to retain a pin in said recess during a portion of a revolution of said wheel.

32. In a pin setting machine for a bowling alley, a rotatable wheel having its axis of rotation disposed transversely of the alley, and having a recess in its periphery to receive a pin, and lateral and circumferential guides to retain a pin in said recess during a portion of a revolution of said wheel, said lateral guide being cut away at the point of delivery to permit the pin to be discharged from the recess.

33. In a pin setting machine for a bowling alley, a rotatable wheel having its axis of rotation disposed transversely of the alley, and having a recess in its periphery to receive a pin, and lateral and circumferential guides to retain a pin in said recess during a portion of a revolution of said wheel, said lateral guide being cut away at the point of delivery to permit the pin to be discharged from the recess, and a chute at the point of delivery to receive the discharged pin.

34. In a pin setting machine for a bowling alley, a vertically reciprocating magnet, a circuit in which said magnet is connected, means operated by contact with a pin for closing the circuit, and means for automatically breaking the circuit when said magnet has reached a predetermined height.

35. In a pin setting machine for a bowling alley, a pin seat, a magnet adapted to reciprocate above said seat, a circuit in series with said magnet means movable with the magnet for closing said circuit when said magnet is lowered into contact with a pin on said seat, and means for automatically breaking said circuit when said magnet has reached its uppermost position.

36. In a pin setting machine for a bowling alley, a magnet adapted to elevate pins, an electric circuit in series with said magnet, an armature movably mounted with respect to said magnet, and a switch operated by said armature to open and close said circuit.

37. In a pin setting machine for a bowling alley, a vertically reciprocating magnet adapted to carry pins on its upward movement, means for receiving the elevated pins, means for automatically de-energizing the magnet at the limit of its upward stroke, and means for directing the elevated pins into said receiving means.

38. In a pin setting machine for a bowling alley, a vertically reciprocating magnet for elevating pins, means for emergizing said magnet upon contact with a pin in position to be elevated, means for automatically de-energizing said magnet at a suitable elevation, means for receiving pins at such elevation, and means for directing elevated pins into said receiving means.

39. In a pin setting machine for a bowling alley, pin elevating means including seats adapted to receive pins with their butts downward, a pair of alternately reciprocating magnets, means to energize said magnets upon contact with the head of a pin, and means to de-energize said magnets when they have reached a suitable height.

40. In a pin setting machine for a bowling alley, pin elevating means including vertically reciprocating magnets, means for reciprocating said magnets, pin seats adapted to support pins in position to be engaged by said magnet, a chute adapted to receive the elevated pins, means for de-energizing said magnet at a suitable height, and means for directing the elevated pins into said chute.

41. In a pin setting machine for a bowling alley, pin elevating means including a vertically reciprocating magnet, an electric circuit in series with said magnet, means operated by contact with a pin for closing said circuit, means for reciprocating said magnet, and means connected with said last named means for breaking the circuit when said magnet has reached a suitable height.

42. In a pin setting machine for a bowling alley, pin elevating means including vertically reciprocating magnets, means for energizing said magnets, pin seats adapted to support pins in position to be engaged by said magnets, means for receiving the elevated pins, means for reciprocating said magnets including a shaft, and means operated by said shaft for de-energizing each of said magnets when they reach a predetermined height.

43. In a pin setting machine for a bowling alley, a pin elevator including a vertically reciprocating magnet, an electric circuit in which said magnet is connected, and including a plurality of switches, means for automatically closing one of said switches to energize the magnet upon contact with a pin to be elevated, and means for automatically opening the other of said switches to de-energize said magnet when it has reached a predetermined height.

44. In a pin setting machine for a bowling alley, a vertically reciprocating magnet adapted to elevate pins, means for receiving the elevated pins, means for de-energizing the magnet when it has reached a predetermined elevation, and means operated by the upward movement of the magnet for directing the elevated pins into said receiving means.

45. In a pin setting machine for a bowling alley, a continuously rotating shaft, a sprocket shaft, means connecting said shafts adapted to cause the sprocket shaft to rotate alternately in opposite directions, a sprocket on said sprocket shaft, a chain on said sprocket, and pin elevating means carried by said chain.

46. In a pin setting machine for a bowling alley, the combination with a pin elevator comprising, a continuously rotating shaft, a sprocket shaft, means connecting said shafts adapted to cause the sprocket shaft to rotate alternately in opposite directions, a sprocket on said sprocket shaft, a chain on said sprocket, a magnet carried by each end of said chain for carrying the pins, and a circuit for the magnet including a switch operated by contact with the pins, of pin receiving means at the upper positions of said magnets.

47. In a pin setting machine for a bowling alley, the combination with a pin elevator comprising a continuously rotating shaft, a sprocket shaft, means connecting said shafts adapted to cause the sprocket shaft to rotate alternately in opposite directions, a sprocket on said sprocket shaft, a chain on said sprocket, a magnet carried by each end of said chain, an electric circuit in which said magnets are connected, switches in said circuit, and cams operated by said continuously rotated shaft for opening said switches at predetermined times, of a rotary creel, and pin receiving means at the upper positions of the magnets adapted to deliver the pins to the creel.

48. In a pin setting machine for a bowling alley, the combination with a pin elevator comprising a continuously rotating shaft, a sprocket shaft, means connecting said shafts adapted to cause the sprocket shaft to rotate alternately in opposite directions, a sprocket on said sprocket shaft, a chain on said sprocket, a magnet carried by each end of said chain, electric circuits in which said magnets are connected, switches in said circuits, and cams operated by said continuously rotating shaft adapted to break the circuit of each magnet as that magnet reaches its highest elevation, of a rotary creel, and pin receiving means at the upper positions of the magnets adapted to deliver the pins to the rotary creel.

49. In a pin setting machine for a bowling alley, a vertically reciprocating magnet, pin receiving means adjacent to the upper position of said magnet, and a kicker adapted to be moved by said magnet to direct a pin from said magnet to said pin receiving means.

50. In a pin setting machine for a bowling alley, a vertically reciprocating magnet, pin receiving means adjacent to the upper position of said magnet, a kicker pivotally mounted above the upper position of said magnet and adapted to be operated by said magnet to direct a pin into said pin receiving means.

51. In a pin setting machine for a bowling alley, a vertically reciprocating magnet, pin receiving means adjacent to the upper position of said magnet, a kicker pivoted adjacent to the upper position of said magnet and comprising an arm adapted to be struck by said magnet, and an arm adapted to strike a pin carried by said magnet and direct it into said pin receiving means.

52. In a pin setting machine for a bowling alley, a vertically reciprocating magnet, an electric circuit in which said magnet is connected, pin receiving means adjacent to the upper position of said magnet, a kicker adapted to be operated by contact with said magnet to direct a pin from said magnet into said pin receiving means, and means for breaking the circuit of said magnet as the kicker is operated.

53. In a pin setting machine for a bowling alley, a pair of pin seats, vertical guides adjacent to said pin seats, a pair of magnets adapted to reciprocate alternately along said guides, pin receiving means adjacent to the upper position of said magnets, a shaft supported adjacent to the upper position of said magnets, and a kicker for each magnet pivoted to said shaft and comprising an arm adapted to be struck by said magnet, and an arm adapted to strike a pin carried by said magnet to direct it into said pin receiving means.

54. In a pin setting machine for a bowling alley, the combination with a pin elevator comprising a continuously rotating shaft, a sprocket shaft, a sprocket chain driven by said sprocket shaft, magnets carried by the chain for raising the pins, means for driving said sprocket shaft on said continually rotating shaft including a crank, a rack pivotally connected with said crank, and gearing operated by said rack, of a plurality of rotatable wheels adapted to deliver the pins to the elevator.

55. In a pin setting machine for a bowling alley, a magazine in which the pins are assembled including a rotating creel having a plurality of cages adapted to receive pins one at a time, pin elevating means including a vertically reciprocating magnet, means for reciprocating said magnet and rotating said creel, and means for preventing rotation of said creel when said magnet fails to elevate a pin.

56. In a pin setting machine for a bowling alley, a magazine in which the pins are assembled including a rotating creel having a plurality of cages adapted to receive pins one at a time, pin elevating means including a vertically reciprocating magnet, means for rotating said creel including a pawl and ratchet, a magnet adapted to engage said pawl with said ratchet, an electric circuit in which said magnets are connected adapted to be closed by the engagement of said vertically reciprocating magnet with a pin.

57. In a pin setting machine for a bowling alley, a magazine in which the pins are assembled including a rotating creel having a plurality of cages adapted to receive pins one at a time, pin elevating means including a vertically reciprocating magnet adapted to deliver pins to the creel one at a time, means for rotating said creel including a pawl and ratchet, a magnet adapted to control said pawl, an electric circuit in which said magnets are connected, and means for breaking said circuit as the vertically reciprocating magnet reaches its highest position.

58. In a pin setting machine for a bowling alley, a magazine in which the pins are assembled including a rotating creel having a plurality of cages adapted to receive pins one at a time, means for rotating said creel including a connecting rod, an arm movable with respect to said creel and pivoted to said connecting rod, a ratchet fixed with respect to said creel, a pawl carried by said arm, and a magnet for controlling said pawl.

59. In a pin setting machine for a bowling alley, a rotary creel, a ratchet fixed with respect to said creel, an arm movable with respect to said creel, a connecting rod for driving said arm, a pawl carried by said arm adapted to co-operate with said ratchet to drive said creel, a magnet for controlling said pawl and another pawl adapted to lock said creel against reverse movement.

60. In a pin setting machine for a bowling alley, a rotating creel, a ratchet wheel carried by said creel, an arm pivoted with respect to said creel and carrying a pawl adapted to engage with said ratchet, a magnet for controlling said pawl, means for rocking said arm, a second pawl adapted to lock said creel against movement, and means carried by the first mentioned pawl for releasing the second pawl.

61. In a pin setting machine for a bowling alley a rotating creel, a plurality of cages carried by said creel, a pin retainer rotatably mounted with respect to said creel, means for holding said pin retainer in position to retain pins in said cages, including a latch, and fixed means in the path of said latch adapted to release said pin retainer at a predetermined point in the operation of the machine.

62. In a pin setting machine for a bowling alley, a rotating creel, a plurality of cages carried by said creel, a pin retainer having means to retain pins within said cages, said pin retainer being rotatably mounted with respect to said creel, means for preventing relative rotation of said creel and said pin retainer, including a pivoted latch carried by said pin retainer, means carried by said creel adapted to engage said latch, and a fixed abutment adapted to release said latch at a predetermined point in the operation of the machine.

63. In a pin setting machine for a bowling alley, a rotatable creel, a plurality of pin cages carried by said creel, a pin retainer having means to retain pins within said cages, and rotatably mounted with respect to said creel, means to constrain said creel and said pin retainer to rotate together, means to cause relative rotation between said creel and said pin retainer to discharge the pins, and means to return said creel and said pin retainer to normal position.

64. In a pin setting machine for a bowling alley, a rotatable creel, a shaft on which said creel is mounted, a pin retainer rotatably mounted on said shaft, means for constraining said creel and pin retainer to rotate together during a predetermined period, means to release said pin retainer at the end of the predetermined period and hold it stationary, and means to release said pin retainer from the last named means.

65. In a pin setting machine for a bowling alley, a rotatable creel, a shaft on which the creel is mounted, a pin retainer rotatably mounted on said shaft, means to limit the relative movement of said pin retainer and said creel, an arm carried by said creel, a treadle carried by said pin retainer adapted to be engaged by said arm, a trip carried by said pin retainer, fixed means adapted to engage said trip, a latch carried by said pin retainer adapted to limit the movement of said trip, and an arm carried by said latch lying in the path of said first mentioned arm when said trip is in engagement with said fixed means.

66. In a pin setting machine for a bowling alley, a magazine including a pin supporting frame, a plurality of guides leading to said frame for placing the pins in triangular formation, a rotating receiver adapted to receive pins, one at a time, means for retaining the pins in said receiver, and to hold them in a ring formation equidistantly spaced from each other and from the axis of rotation and means for operating said retaining means to discharge the pins.

67. In a pin setting machine for a bowling alley, a magazine including a pin supporting frame, a plurality of guides leading to said frame, for placing the pins in triangular formation, a receiver having cages adapted to align with said guides, means for retaining the pins within said cages, and means for delivering the pins from said cages to said guides and to hold the pins in a ring formation.

68. In a pin setting machine for a bowling alley, a magazine including a movable pin supporting frame, a plurality of guides leading to said frame for placing the guides in a triangular formation, a receiver communicating with said guides and adapted to hold the pins in a ring formation, means for controlling the movement of pins from said receiver to said guides, and means for moving said pin supporting frame relative to said guides to discharge the pins therefrom.

69. In a pin setting machine for a bowling alley, a magazine in which the pins are assembled including a rotating creel having a plurality of cages adapted to receive pins one at a time and to hold them in a ring formation, and means for rotating said creel as the pins are received.

70. In a pin setting machine for a bowling alley, a magazine in which the pins are assembled including a rotatable creel having a plurality of cages adapted to receive pins and to hold them in a ring formation, means for retaining the pins in said cages, and means for rotating the creel as the pins are received.

71. In a pin setting machine for a bowling alley, a magazine in which the pins are assembled including a rotatable creel having a plurality of cages in which the pins are received, rotatable means adapted to retain pins in said creel, and means for automatically operating said last named means to discharge the pins when said creel has received a predetermined number.

72. In a pin setting machine for a bowling alley, a magazine in which the pins are assembled, including a rotary creel adapted to receive the pins and to hold them in a ring formation, means for retaining the pins in said creel, and means for operating said retaining means to discharge the pins, when a predetermined number has been received.

73. In a pin setting machine for a bowling alley, a magazine in which the pins are assembled including a rotary creel having a plurality of cages in which the pins are received, a rotary stop adapted to retain pins in said creel until a predetermined number is received, and means for automatically rendering said stop ineffective upon the receipt of the last one of a predetermined number.

74. In a pin setting machine for a bowling alley, a magazine in which the pins are assembled including a rotary creel having a plurality of cages adapted to receive pins, a stop for retaining the pins in said cages, said stop adapted to rotate with said creel until a predetermined number of pins have been received, and means for automatically rotating said creel relative to said stop for discharging the pins therefrom.

75. In a pin setting machine for a bowling alley, pin elevating means including a magnet adapted to elevate one pin at a time, a pin magazine adapted to receive the pins one at a time including a rotatable receiver, means for rotating the receiver as the pins are received, means for retaining pins in said receiver, and means for automatically discharging pins therefrom.

76. In a pin setting machine for a bowling alley, means including a magnet for elevating pins one at a time, a magazine adapted to receive the pins including a rotatable receiver, and means for rotating the receiver as the pins are received.

77. In a pin setting machine for a bowling alley, pin elevating means including a magnet adapted to operate continuously, a receiver adapted to receive the elevated pins, means for rotating the receiver as the pins are received, and means for preventing rotation of the receiver when no pin is received.

78. In a pin setting machine for a bowling alley, pin elevating means including a magnet adapted to elevate one pin at a time, pin receiving means adapted to receive one pin at a time, means to rotate said pin receiving means as the pins are received, and means to prevent rotation of said receiver upon the failure of said elevating means to elevate a pin.

79. In a pin setting machine for a bowling alley, pin elevating means including a vertically reciprocating magnet, a rotatable receiver adapted to receive the pins from said magnet, means for rotating said receiver as the pins are received, and means for rendering said last named means inoperative when the magnet ascends without a pin.

80. In a pin setting machine for a bowling alley, pin elevating means including a vertically reciprocating magnet, an electric circuit in which said magnet is connected, means operated by contact with a pin to be elevated for closing said circuit, a receiver adapted to receive the elevated pins, means for rotating said receiver, and means operated by the closing of said circuit for rendering said last named means operative.

81. In a pin setting machine for a bowling alley, a pin setter adapted to receive pins in an elevated position, and to hold the pins in substantially upright positions when it is in its elevated position and operable to descend and place the pins on an alley, means to operate said pin setter, and means to prevent the descent of said pin setter when it contains no pins.

82. In a pin setting machine for a bowling alley, a pin setter adapted to receive pins in an elevated position and operable to descend and place pins on an alley, the pin setter being adapted to hold the pins in substantially upright positions when it is in its elevated position, a pin support adapted to support pins in a position to be delivered to the pin setter, means to operate said pin support to discharge pins into the pin setter, and means to prevent the operation of the pin support unless the pin setter is empty.

83. In a pin setting machine for a bowling alley, a pin setter adapted to receive pins in an elevated position and operable to descend and place the pins on an alley, the pin setter being adapted to hold the pins in substantially upright positions when it is in its elevated position, a pin support to support pins in position to be delivered to said pin setter, and means to operate said pin support including a pin and slot connection whereby said pin support is held against operation when the pin setter is filled.

84. In a pin setting machine for a bowling alley, a pin setter adapted to receive pins in an elevated position, and to hold them in a triangular formation, said pin setter being operable to descend and place the pins on an alley, a pin support adapted to support pins in a ring formation and to deliver the pins to the pin setter, means to operate said pin support to discharge pins into the pin setter comprising a rotatable shaft, and a connection between said shaft and said pin support including a pin and slot joint, and a latch adapted to secure said pin against movement in the slot.

85. In a pin setting machine for a bowling alley, a pin support for holding the pins in ring formation, means to move said support to discharge pins therefrom including a rotating shaft, a lever operated by said rotating shaft, a link connected to said pin support, a yielding connection between said link and said lever, and stationary guides to receive the pins from the pin support and to bring them into a triangular formation.

86. In a pin setting machine for a bowling alley, a pin support for holding the pins in a ring formation, means to operate said pin support to discharge the pins therefrom including a shaft, a lever, an operative connection between said shaft and said lever, an operative connection between said lever and said pin support, and stationary guides to receive the pins from the pin support and to bring them into a triangular formation.

87. In a pin setting machine for a bowling alley, a pin support for holding a full set of pins in a ring formation and movable to discharge the pins therefrom, means for moving said pin support including a shaft, a crank carried by said shaft, a lever operated by said crank, a link connected with said pin support having a slot therein, a pin carried by said lever movable in said slot, and a latch pivoted to said link and adapted to secure said pin against movement in said slot.

88. In a pin setting machine for a bowling alley, a pin support adapted to support pins in an elevated position and in a ring formation, said pin support movable to discharge pins therefrom, means for moving said pin support including a rotatable shaft, a crank carried by said shaft, a link pivoted to said crank, a pivoted lever, a pin and slot connection between said link and said lever, a second pivoted lever, a link connecting the two levers, a link pivoted to said pin support having a slot therein, a pin carried by the last mentioned lever and movable in said slot, and a latch to secure said pin against movement in said slot.

89. In a pin setting machine for a bowling alley, a pin setter adapted to receive pins in an elevated position and to hold them in a triangular formation, said pin setter being operable to descend and place the pins on an alley, a pin support adapted to support pins in a position to be delivered to the pin setter, said pin support being adapted to hold the pins in a ring formation, means to operate said pin support to discharge pins into the pin setter including a lever, a link having a slot therein, a pin on said lever adapted to move in said slot, and a latch operable by the upward movement of said pin setter to secure said pin against movement in said slot.

90. In a pin setting machine for a bowling alley, a pin setter adapted to receive pins in an elevated position and to hold them in a triangular formation, said pin setter being operable to descend and place the pins on an alley, a pin support adapted to support pins in position to be delivered to the pin setter, said pin support being adapted to hold the pins in a ring formation, means to operate said pin support to discharge pins into the pin setter including a latch, means carried by said pin setter adapted to engage with said latch, and means operated by the pin descending into the pin setter for moving the last named means away from said latch.

91. In a pin setting machine for a bowling alley, a pin setter adapted to receive pins in an elevated position and operable to descend and place the pins on an alley, said pin setter being adapted to hold the pins in a triangular formation, a pin support adapted to support pins in position to be delivered to the pin setter, said pin support being adapted to hold the pins in a ring formation, means to operate said pin support, and means carried by said pin setter for rendering the last named means effective.

92. In a pin setting machine for a bowling alley, a pin setter adapted to receive pins in an elevated position and operable to descend and place the pins on an alley, a pin support comprising a supporting plate common to a full set of pins and adapted to support pins in position to be delivered to said pin setter, means for moving said pin support to discharge pins into the pin setter, means carried by the pin support for releasing said last named means upon the receipt of pins in the pin setter, and means to prevent the release of said means until pins are received in the pin setter.

93. In a pin setting machine for a bowling alley, a pin setter adapted to receive pins in an elevated position and operable to descend and place pins on an alley, a pin support comprising a supporting plate common to a full set of pins and adapted to support pins in position to be delivered to the pin setter, means for moving the pin support to deliver the pins to the pin setter, movable means mounted on the pin setter for controlling the last named means, and means operated by descent of pins into the pin settter for moving the movable means.

94. In a pin setting machine for a bowling alley, a pin setter adapted to move up and down, means for moving said pin setter including a lever having a slot therein, a rack, a pin carried by said rack and resting in said slot, and a latch for securing said pin against movement in said slot, a reciprocating rod adapted to move said pin along said slot, and means carried by said rod for releasing said latch.

95. In a pin setting machine for a bowling alley, a pin setter adapted to move up and down, means for moving said pin setter including a lever having a slot therein, a rack, a pin carried by said rack and resting in said slot, and a latch for securing said pin against movement in said slot, a reciprocating rod adapted to move said pin along said slot, and a link carried by said rod having a sliding connection with said latch and adapted to release said latch at predetermined times.

ERNEST HEDENSKOOG.